United States Patent
Gong et al.

(10) Patent No.: US 9,460,172 B2
(45) Date of Patent: Oct. 4, 2016

(54) METHOD TO REDUCE LARGE OLAP CUBE SIZE USING CELL SELECTION RULES

(71) Applicant: SAS Institute Inc., Cary, NC (US)

(72) Inventors: Qing Gong, Cary, NC (US); Amy Spelman Davis, Raleigh, NC (US); Ryan Norris, Cary, NC (US); Enrico Stevanoni, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 219 days.

(21) Appl. No.: 14/209,739

(22) Filed: Mar. 13, 2014

(65) Prior Publication Data

US 2014/0279833 A1    Sep. 18, 2014

Related U.S. Application Data

(60) Provisional application No. 61/779,387, filed on Mar. 13, 2013.

(51) Int. Cl.
*G06F 17/30*    (2006.01)

(52) U.S. Cl.
CPC ... *G06F 17/30563* (2013.01); *G06F 17/30592* (2013.01)

(58) Field of Classification Search
CPC .................. G06F 17/30554; G06F 17/30592; G06F 17/3046
USPC ......................................... 707/600, 756, 602
See application file for complete search history.

(56) References Cited

U.S. PATENT DOCUMENTS

| | | | |
|---|---|---|---|
| 6,442,560 B1 * | 8/2002 | Berger | G06F 17/18 |
| 6,477,536 B1 * | 11/2002 | Pasumansky | G06F 17/30418 |
| 6,775,662 B1 | 8/2004 | Witkowski et al. | |
| 7,133,876 B2 | 11/2006 | Roussopoulos et al. | |
| 7,305,408 B2 | 12/2007 | Morris | |
| 7,464,080 B2 | 12/2008 | Cotner et al. | |
| 7,584,202 B2 | 9/2009 | Subramaniam et al. | |
| 7,805,433 B2 * | 9/2010 | Dickerman | G06F 17/246 707/706 |
| 7,970,790 B2 | 6/2011 | Yang et al. | |
| 8,521,755 B2 * | 8/2013 | Mahajan | G06F 17/30592 707/756 |
| 8,676,801 B2 * | 3/2014 | Gong | G06F 17/30333 707/736 |
| 9,223,832 B2 * | 12/2015 | Hamborg | G06F 17/30592 |
| 2004/0093412 A1 * | 5/2004 | Chen | G06Q 10/10 709/224 |
| 2004/0122844 A1 * | 6/2004 | Malloy | G06F 17/30592 |

(Continued)

OTHER PUBLICATIONS

Xie et al.,"The Algorithm of Reducing Data Cube Size Rapdly", ISBN 978-1-4244-4639-1, IEEE, Sep. 20-22, 2009, 4 pages.

(Continued)

*Primary Examiner* — Jean M Corrielus

(57) ABSTRACT

Various embodiments are directed to techniques for providing one or more reduced-size rule cubes indicating cell rules. A computer-program product embodied in a machine-readable storage medium includes instructions to cause a computing device to select a cell rule to include in a rule cube based on applicability of the cell rule to a selected portion of a data cube; analyze the cell rule to identify a wildcarded dimension in a specification of cells of the data cube that are subject to the cell rule; and generate the rule cube indicating applicability of the cell rule to the selected portion of the data cube, wherein a cell of the rule cube corresponds to multiple cells of the data cube, and wherein the wildcarded dimension of the rule cube is reduced in length in comparison to a length of the wildcarded dimension of the data cube. Other embodiments are described and claimed.

23 Claims, 12 Drawing Sheets

(56) References Cited

U.S. PATENT DOCUMENTS

| | | | |
|---|---|---|---|
| 2006/0085444 A1* | 4/2006 | Sarawgi | G06F 17/3046 |
| 2007/0088691 A1* | 4/2007 | Dickerman | G06F 17/246 |
| 2010/0312748 A1* | 12/2010 | Dickerman | G06F 17/30592 707/602 |
| 2011/0055146 A1* | 3/2011 | Mahajan | G06F 17/30554 707/600 |
| 2012/0084250 A1* | 4/2012 | Gundorov | G06F 17/30592 707/600 |
| 2013/0054608 A1* | 2/2013 | Gong | G06F 17/30592 707/741 |
| 2014/0181002 A1* | 6/2014 | Christian | G06F 17/30592 707/600 |

OTHER PUBLICATIONS

Harinarayan et al., "Implementing Data Cubes Efficiently", SIGMOD '96, Montreal, Canada, 1996 ACM 0-89791-794, 12 pages.

Wang et al., "Condensed Cube: An Effective Approach to Reducing Data Cube Size", Hong Kong University of Science and Technology, 2002, 11 pages.

Sismanis et al., "The Dwarf Data Cube Eliminates the High Dimensionality Curse", University of Maryland—Institute for Advanced Computer Studies, 2003, 11 pages.

"Writeback performance issue when cell security is enabled in SQL Server Analysis Services", Microsoft Support, <http://support.microsoft.com/kb/2747616>, 1 page, (date & author unknown).

"SP2 + cell data security = performance problem", Microsoft SQL Server, <http://social.msdn.microsoft.com/Forums/en-US/sqlanalysisservices/thread/12f07889-5ea9-4c18-b5d7-69a3bc4d8b17>, 2 pages, Mar. 5, 2007, (author unknown).

"Performance Improvements for MDX in SQL Server 2008 Analysis Services", Microsoft Developer Network, 2010, 7 pages, (author unknown).

Agarwal et al., "On the Computation of Multidimensional Aggregates", Proc. of the 22 VLDB Conference, Mumbai, India, 1966, 16 pages.

Whitney, Russ, "Mastering OLAP: Cell-level Security", SQL Serverpro, <http://sqlmag.com/querying/mastering-olap-cell-level-security>, Oct. 23, 1999, 5 pages.

* cited by examiner

METHOD TO REDUCE LARGE OLAP CUBE SIZE USING CELL SELECTION RULES

CROSS-REFERENCE TO RELATED APPLICATION

This application claims the benefit of priority under 35 U.S.C. §119(e) to U.S. Provisional Application Ser. No. 61/779,387, entitled "A METHOD TO REDUCE LARGE ONLINE ANALYTICAL PROCESSING CUBE SIZE USING CELL SELECTION RULES," filed Mar. 13, 2013, the disclosure of which is incorporated herein by reference.

BACKGROUND

Multi-dimensional data cubes employ a multi-dimensional indexing scheme to organize large quantities of detailed data. Such detailed data may be associated with any of a variety of subjects, including inventories, sales, manufacturing output, census data, data collected from scientific experiments, social networking statistics, etc. Cells within such data cubes often contain aggregated data (also commonly referred to as "measures") derived from more detailed data and/or pointers to such detailed data. Often accompanying a data cube is a rule cube having the same size and dimensions as the data cube. There cells within such rule cubes often exist in a one-to-one correspondence with the cells of the data cube, and contain indications of cell rules defining restrictions on access to the corresponding cells of the data cube. Since their inception, data cubes have come to be used to organize increasingly larger quantities of data with ever increasing numbers of dimensions. As a result, the size of the data structures used to represent both the data cubes and corresponding rule cubes have begun to exceed various limitations imposed in various computing devices.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product tangibly embodied in a non-transitory machine-readable storage medium, the computer-program product including instructions operable to cause a computing device to perform operations including select a first cell rule applicable to a data cube to include in a rule cube associated with the data cube based on applicability of the first cell rule to a selected portion of the data cube; analyze the first cell rule to identify at least one dimension of the data cube that is wildcarded in a first specification of the first cell rule of cells of the data cube that are subject to the first cell rule; and generate the rule cube indicating applicability of the first cell rule to the selected portion of the data cube, wherein a cell of the rule cube corresponds to multiple cells of the data cube, and wherein at least one dimension of the rule cube that corresponds to the at least one dimension of the data cube is reduced in length in comparison to a length of the at least one dimension of the data cube.

A computer-implemented method comprising selecting, on a computing device, a first cell rule applicable to a data cube to include in a rule cube based on applicability of the first cell rule to a selected portion of the data cube; analyzing, on the computing device, the first cell rule to identify at least one dimension of the data cube that is wildcarded in a first specification of the first cell rule of cells of the data cube that are subject to the first cell rule; and generating, on the computing device, the rule cube indicating applicability of the first cell rule to the selected portion of the data cube, wherein a cell of the rule cube corresponds to multiple cells of the data cube, and wherein at least one dimension of the rule cube that corresponds to the at least one dimension of the data cube is reduced in length in comparison to a length of the at least one dimension of the data cube.

An apparatus comprising a processor component, a selection component for execution by the processor component to select a first cell rule applicable to a data cube based on applicability of the first cell rule to a selected portion of the data cube, and a generating component. The generating component is for execution by the processor component to analyze the first cell rule to identify at least one dimension of the data cube that is wildcarded in a first specification of the first cell rule of cells of the data cube that are subject to the first cell rule; and generate a rule cube indicating applicability of the first cell rule to the selected portion of the data cube, wherein a cell of the rule cube corresponds to multiple cells of the data cube, and wherein at least one dimension of the rule cube that corresponds to the at least one dimension of the data cube is reduced in length in comparison to a length of the at least one dimension of the data cube.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
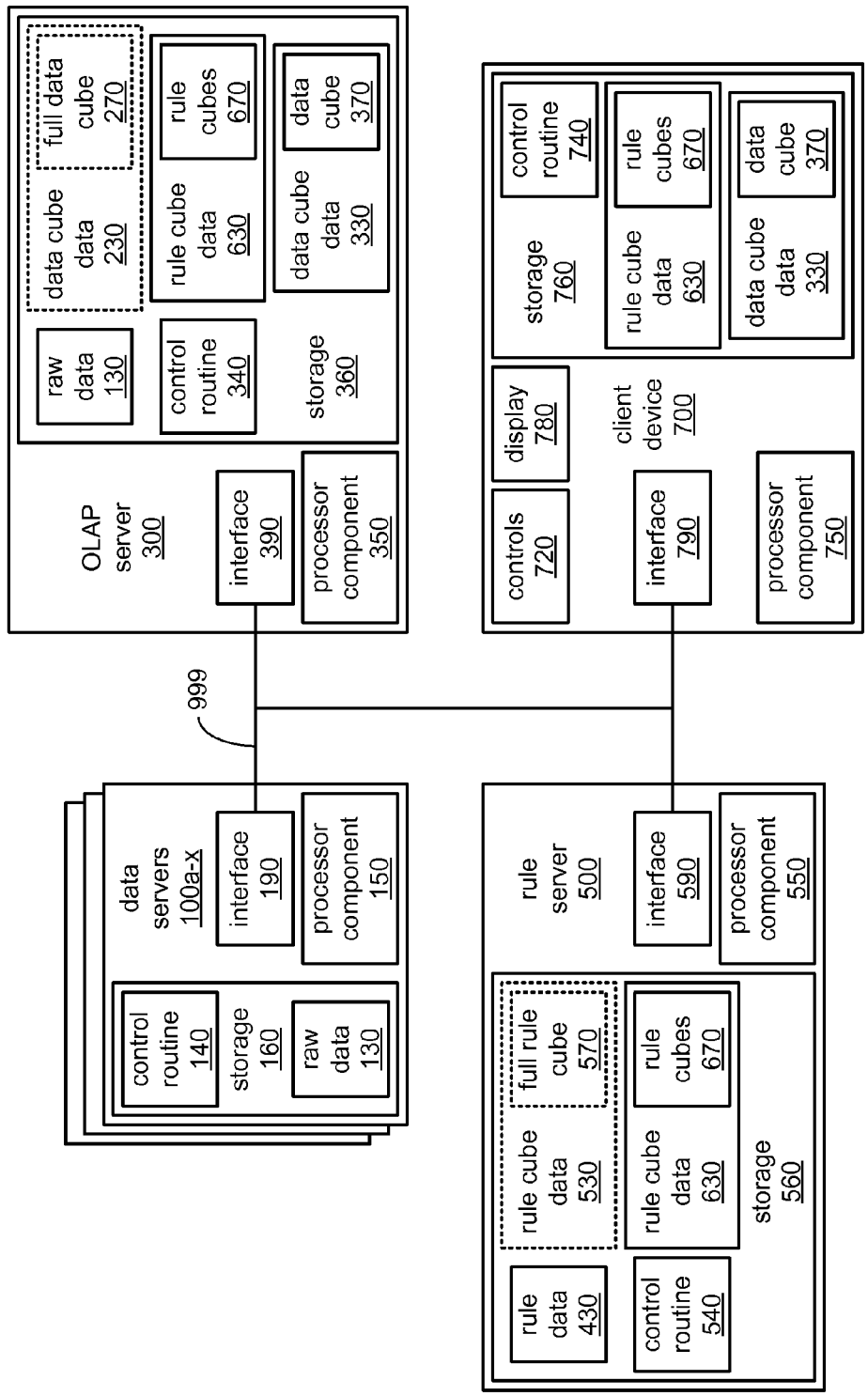
FIG. 1 illustrates an example of an online analytical processing system.

Various embodiments are generally directed to techniques for supporting the provision of a data cube to a client device by providing the client device with one or more reduced-size rule cubes indicating data cube cell rules. Such provision of reduced-size rule cubes may be in response to a request from the client device for an indication of those cell rules prior to requesting the data cube. The one or more reduced-size rule cubes may be provided to the client device in lieu of a single full-size rule cube that may be too large to be practical or possible to generate and/or transmit to the client device. In some embodiments, the one or more reduced-size rule cubes may also be employed in generating the data cube to enable selective instantiation of cells of the data cube.

As familiar to those skilled in the art, a data cube is a multi-dimensional data structure in which locations along each of the dimensions are used in combination as a multi-dimensional indexing scheme to specify a location within the volume of the data cube at which a cell may be instantiated to store data and/or a pointer to data. Each dimension is divided into "members" that serve as specifiable locations along each dimension, and the members may be numeric values, names of places or thing, proper names of persons, etc. Thus, the act of specifying a location along one of the dimensions entails specifying the member at that location along that dimension. A location within the volume of a data cube at which a cell may be instantiated is typically referred to as a "crossing," and a crossing is identified by specifying the members that indicate its location along each of the dimensions. A piece of data stored within an instantiated cell of a data cube is typically referred to as a "measure," and is often a piece of aggregated data that represents a sum, average or other combinatorial value derived from other more detailed data stored in one or more other data structures. A pointer stored within a cell of a data cube is typically a pointer to data maintained in another data structure.

A cell of a data cube may include both a "measure" made up of an aggregated data value derived from more detailed data stored in another data structure, and a pointer to that more detailed data in that other data structure. This inclusion of both a measure and a pointer to the data from which the measure was derived may be used to enable "drilling down" into the more detailed data behind the aggregated data value of the measure. It is through this direct provision of aggregated data and the provision of access via a pointer to more detailed data associated therewith in each cell that enables a data cube can be employed to organize large quantities of detailed data. The multi-dimensional indexing scheme enables easier access to both the aggregated data and the pointers, thereby enabling easier access to and comprehension of aspects of large quantities of data.

A data cube may be accompanied by a rule cube. The rule cube is another multi-dimensional structure of the same dimensions and employing the same multi-dimensional indexing scheme to specify crossings at which cells may be instantiated to store an indication of one or more cell rules. A cell rule may define the degree of available access to a corresponding cell of the data cube. For example, a rule cube may be created to specify conditions under which the contents of one or more cells of its corresponding data cube (e.g., measures and/or pointers) may be accessed by a particular client device and/or a particular operator of a client device. Alternatively or additionally, a cell rule may define the manner in which a measure may be used in the performance of a calculation or other processing operation. For example, a rule cube may be created to specify conditions under which a measure may be used as an input to a calculation involving multiple neighboring cells (sometimes referred to as a "stencil" calculation) and/or the conditions under which a measure may be modified by such a calculation (e.g., minimum and/or maximum limits of a final value, a limit on a degree of change, etc.).

Both data cubes and rule cubes are typically represented in the storage of a computing device as a data structure (e.g., an array) that typically employs a flat (e.g., one-dimensional) integer-based indexing scheme. Such a data structure includes an indication of the mapping of its flat index to the multi-dimensional indexing scheme of the data or rule cube it represents, and it is not uncommon for that mapping to be identical between corresponding rule and data cubes, since they share a common multi-dimensional indexing scheme. Unfortunately, as the use of data cubes to organize data has increased, so has the size and number of dimensions of typical data cubes and their corresponding rule cubes. As a result, difficulties have begun to be encountered in simply instantiating a full data or rule cube as the growing size and number of dimensions has begun to exceed what can be represented with typical flat-indexed data structures in many computing devices. By way of example, the quantity of crossings of typical data and/or rule cubes has begun to exceed the maximum quantity of integers able to be represented with binary-coded integers (often referred to as "MAXINT") in many typical computing devices. Even where a computing device is still able to instantiate a full data or rule cube, the growing size and number of dimensions also results in a prohibitive consumption of available data bandwidth in typical networks to transmit that full data or rule cube.

To address this, at least with regard to rule cubes, the instantiation and transmission of a full rule cube corresponding to a full data cube may be avoided, and one or more reduced-size rule cubes may be instantiated and transmitted, instead. More precisely, generation of a single full-sized rule cube incorporating cells in which are stored indications of rules applied to individual corresponding cells of a corresponding full-sized data cube is avoided. Instead, each cell rule is analyzed to determine its configuration of "wildcarded" versus "non-wildcarded" dimensions. Rules having the same dimensional wildcarding configuration are combined, and a reduced-sized cube representing each such combination of rules is generated. In each such reduced-sized cube, the wildcarded dimensions are generated to have a reduced length. This reduced length may be a length of one member in some embodiments, or this reduced length be a zero length such that a wildcarded dimension is omitted. Such reductions in length of wildcarded dimensions greatly reduce the number of possible crossings within the volume of each such reduced-sized cube, thereby reducing the quantity of integers required to implement a flat index to represent it with a data structure.

One or more of such reduced-sized rule cubes may be transmitted to a client device in response to a request received therefrom for an indication of the cell rules applicable to the data cube to which the reduced-sized rule cubes correspond. Alternatively or additionally, such reduced-sized rule cubes may be employed in generating a version of the data cube intended to be provided to the client device in which cells of the data cube are selectively instantiated based on whether the rules indicate that the client device is to have access to those cells.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of an online analytical processing (OLAP) system 1000 incorporating one or more data servers 100a-x, an OLAP server 300, a rule server 500 and/or a client device 700. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 100a-x, 300, 500 and 700 exchange communications conveying data associated with large data and/or rule cubes through a network 999. However, one or more of the computing devices 100a-x, 300, 500 and/or 700 may exchange communications entirely unrelated to data and/or rule cubes with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The one or more data servers 100a-x store raw data 130 from which a data cube may be generated by the OLAP server 300. The OLAP server 300 may provide that data cube to the client device 700 in response to a request from the client device 700 for a data cube. However, before the client device 700 requests a data cube from the OLAP server 300, the client device 700 may request an indication of cell rules applicable to that data cube from the rule server 500.

In response to this request, the rule server 500 may transmit one or more rule cubes 670 to the client device 700. Each of the rule cubes 670 may provide an indication of one or more cell rules applicable to the data cube to be provided to the client device 700 by the OLAP server 300. As will be explained in greater detail, each of the rule cubes 670 is a reduced-sized rule cube inasmuch as each of the rule cubes 670 is not as large, at least in its dimensional volume, as a full rule cube providing indications of all of the cell rules would be. Indeed, all of the rule cubes 670, taken together, occupy less storage space and use less data bandwidth in being transmitted than would a full rule cube providing indications of all of the cell rules for which the rule cubes 670 provide indications. In other words, the rule cubes 670 provide a more compact indication of those cell rules.

Upon receiving the rule cubes 670, the client device 700 may employ those indications of the cell rules to control the generation of its request to the OLAP server 300 for a data cube in a manner that limits the size and/or dimensions of the data cube it requests to tend to include cells storing measures and/or pointers that the client device 700 will be allowed to use for the purpose for which the request is made in light of the cell rules. For example, the client device 700 may employ those indications of the cell rules to refrain from requesting portions including cells to which the client device 700 is not permitted access or to which the client device 700 is permitted read-only access. Alternatively or additionally, the client device 700 may employ those indications of the cell rules to refrain from requesting portions including cells subject to limits on the manner in which their measures may be modified during the performance of a calculation. In this way, the client device 700 refrains from requesting a full data cube from the OLAP server 300 that would include crossings at which there may be cells that the client device 700 is not permitted to use in a manner that defeats the purpose for which the client makes the request. As a result, the OLAP server 300 is not requested to expend processing, storage and/or network communications resources generating and/or transmitting a large data cube incorporating many crossings for cells that the client device 700 is barred from accessing.

In an alternative embodiment, the client device 700 may have already received or otherwise been provide access to a data cube, and may request an indication of cell rules applicable to that data cube to enable more efficient use of it. By way of example, the comparatively smaller size of each of the rule cubes 670 would enable the contents of their cells to be accessed more quickly than the contents of the cells of the data cube. Thus, the client device 700 may precede accesses to each cell of the data cube with an access to a corresponding cell of one or more of the rule cubes 670 to determine whether an intended access to the cell of the data cube is permitted and/or is subject to a limit concerning altering what is stored there.

Regardless of what use the client device 700 may make of the cell rules indicated by the rule cubes 670, the client device 700 analyzes each of the rule cubes 670 to determine what the cell rules are and which data cube cells they apply to. A cell of a data cube may be subject to no cell rules as a result of none of the rule cubes having a corresponding cell that stores an indication of a rule. Alternatively, a cell of a data cube may be subject to a single cell rule as a result of one of the rule cubes having a corresponding cell that stores an indication of that single cell rule. As still another alternative, a cell of a data cube may be subject to multiple cell rules as a result of more than one rule cube having a corresponding cell that stores an indication of one of those cell rules.

It should be noted that despite the specific depiction and discussion herein of each of the computing devices 300, 500 and 700 performing separate and distinct functions, embodiments are possible in which the functions of two or more of these computing devices and/or servers are performed by a single computing device. By way of example, in some embodiments, the OLAP server 300 and the rule server 500 may be combined into a single server that generates and/or transmits both data cube data representing one or more data cubes and rule cube data representing one or more rule cubes. By way of another example, in other embodiments, at least a portion of the functions performed by the client device 700 may be performed as a virtual machine implemented within one of the OLAP server 300 or the rule server 500. In such embodiments, the client device 700 may be implemented as a "dumb terminal" or other type of computing device providing remote access to the virtual machine.

In some embodiments, the rule server 500 may additionally provide the rule cubes 670 to the OLAP server 300 for use in controlling the instantiation of cells of the data cube in response to requests for a data cube, such as the request for a data cube from the client device 700. Like the client device 700, the OLAP server 300 may analyze each of the rule cubes 670 to determine, for each cell of a data cube, whether it is subject to one or more cell rules and what the one or more cell rules are. More precisely, the OLAP server 300 may employ the indications of the cell rules provided in more compact form by the rule cubes 670 to control what cells to instantiate in a data cube generated to satisfy such a request.

In various embodiments, each of the one or more data servers 100a-x incorporates one or more of a processor component 150, a storage 160 and an interface 190 to couple each of the one or more data servers 100a-x to the network 999. The storage 160 of each of the one or more data servers 100a-x stores a control routine 140 and at least a portion of the raw data 130. The control routine 140 incorporates a sequence of instructions operative on the processor component 150 to implement logic to perform various functions.

In executing the control routine 140, the processor component 150 of each of the one or more data servers 100a-x may operate the interface 190 to transmit at least a portion of the raw data 130 to the OLAP server 300. The processor component 150 may do so in response to one or more requests received from the OLAP server 300 for at least a portion of the raw data 130. The raw data 130 may include data on any of a variety of subjects, including and not limited to, manufacturing, inventory, provision of services, financial accounts, financial or other types of transactions, statistics concerning use of services, patient medical data, academic data, customer data, data gathered during scientific experiments, etc.

In various embodiments, the OLAP server 300 incorporates one or more of a processor component 350, a storage 360 and an interface 390 to couple the OLAP server 300 to the network 999. The storage 360 stores one or more of a control routine 340, at least a portion of the raw data 130, data cube data 230 representing a full data cube 270, and data cube data 330 representing a data cube 370. The control routine 340 incorporates a sequence of instructions operative on the processor component 350 to implement logic to perform various functions.

In executing the control routine 340, the processor component 350 of the OLAP server 300 may operate the interface 390 to receive at least a portion of the raw data 130 from one or more of the data servers 100a-x. In some embodiments, at least one of the data servers 100a-x may generate whatever portion of the raw data 130 is provided to the OLAP server 300 from pieces of the raw data 130 received from others of the data servers 100a-x. In other embodiments, the OLAP server 300 may receive pieces of the raw data 130 from one or more of the data servers 100a-x, and the processor component 350 may combine those pieces to generate at least a portion of the raw data 130 stored within the storage 360.

Following such receipt and/or generation of at least a portion of the raw data 130, the processor component 350 may form a data cube from at least a portion of the raw data 130. In so doing, the processor component 350 may generate aggregated pieces of data to be included as measures within cells of a cube from more detailed data within the raw data 130 (e.g., a summation, average, weighted average, etc. of the more detailed data). Alternatively or additionally, the processor component 350 may derive pointers to the more detailed data for inclusion as pointers within cells of a cube.

Figure 2:
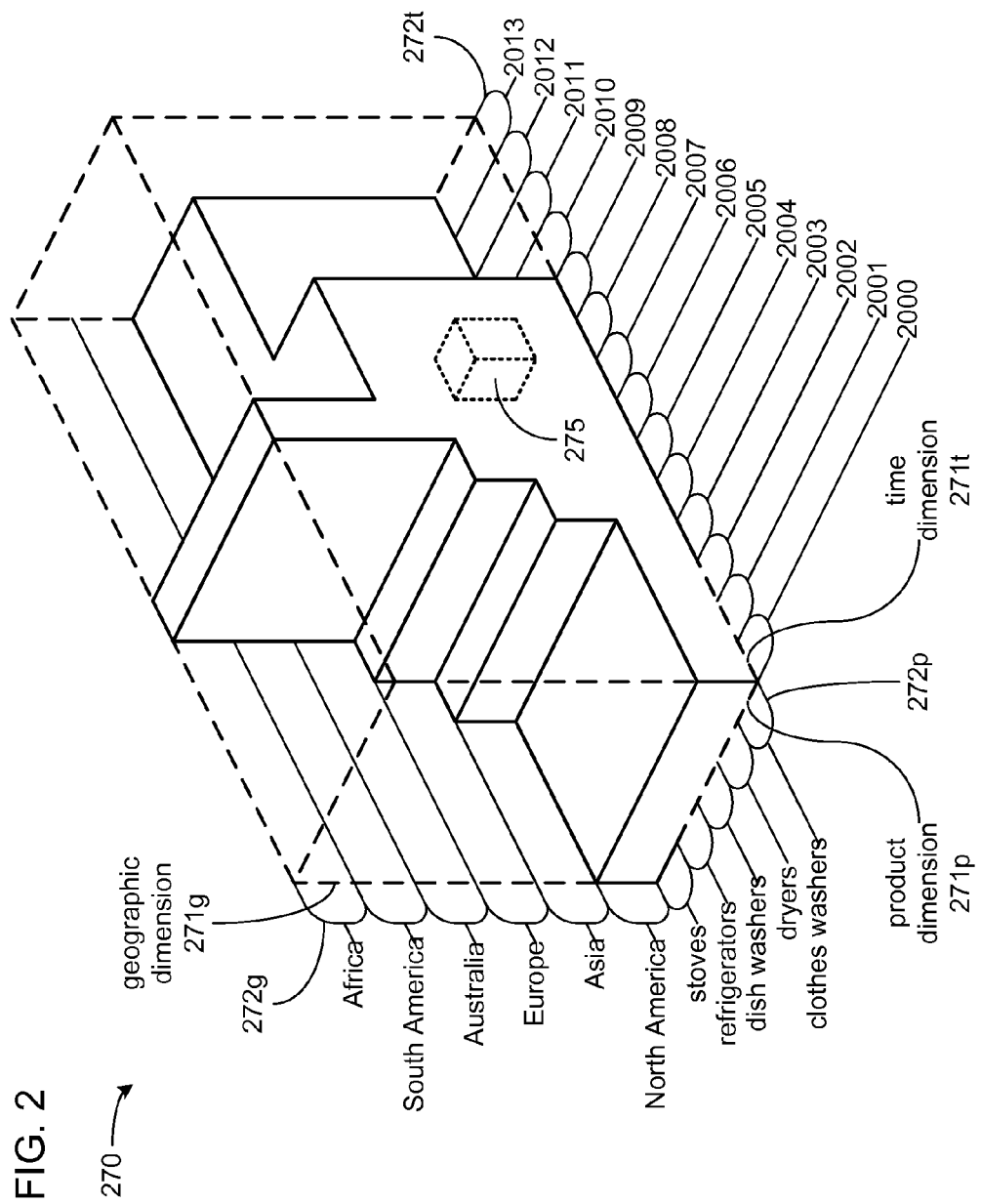
FIG. 2 illustrates an example of a full data cube.

FIG. 2 illustrates an example embodiment of the full data cube 270 that may be generated by the processor component from at least a portion of the raw data 130. It should be noted that, for sake of simplicity in discussion and understanding, the full data cube 270 is a deliberately simple example having only three dimensions 271$g$, 271$p$ and 271$t$, and a relatively small volume capable of including a relatively small quantity of cells 275. It is envisioned that more realistic embodiments of the full data cube 270 would be far larger and/or include a far greater number of dimensions.

The full data cube 270 organizes aggregated data derived from the raw data 130 concerning sales by a company of various home appliances over a period of years in various continents. The cells 275 may contain measures of concerning those sales over periods of entire years and across entire continents, while the raw data 130 may contain indications of specific sales of specific appliances on specific dates in specific store locations. In this example, the full data cube 270 serves as a mechanism to organize the raw data 130 of those sales of stoves, refrigerators, dish washers, dryers and clothes washers over the years 2000 through 2013 in Africa, South America, Australia, Europe, Asia and North America in a manner enabling easier comprehension and access.

In various embodiments, the data cube data 230 may have any of a variety of types of data structure in which flat indexing may be employed, including tables, arrays, etc. The processor component generates entries in that data structure for each cell 275 that is instantiated at a crossing within the full data cube 270. This data structure of the data cube data 230 includes an indication of the mapping of its flat indexing scheme to the multi-dimensional indexing scheme of the full data cube 270 to enable access to a particular one of the entries. The data cube data 230 may also include metadata specifying the dimensions 271$g$, 271$p$ and 271$t$. Alternatively or additionally, the data cube data 230 may also include metadata specifying the members 272$g$, 272$p$ and 272$t$ along corresponding ones of the dimensions 271$g$, 271$p$ and 271$t$.

As depicted, the geographic dimension 271g provides an index in one dimension organized by continent such that Africa, South America, Australia, Europe, Asia and North America are each a member 272g of the geographic dimension 271g. The product dimension 271p provides an index in another dimension organized by product such that stoves, refrigerators, dish washers, dryers and clothes washers are each a member 272p of the product dimension 271p. The time dimension 271t provides an index in still another dimension organized by sequential years such that each of the years 2000 through 2013 are each a member 272t of the time dimension 271t. The act of accessing a cell 275 of the full data cube 270 at a particular crossing entails resolving the location of that crossing along the dimensions 271g, 271p and 271t as indicated by specifying particular ones of the members 272g, 272p and 272t, respectively, to a flat index used to access the entry in the data structure of the data cube data 230 that corresponds to the cell 275 at that crossing. With the corresponding entry found, the act of storing data and/or a pointer in that cell 275 is effected by storing that data and/or pointer in that corresponding entry.

As depicted, there are particular products that have been sold in particular continents by the company that have changed over time. For example, from 2000 to 2003, the company sold stoves, refrigerators, dish washers, dryers and clothes washers only in North America. The company then added sales of all five products in Asia in 2004, added sales of all five products in Europe in 2005, and then added sales of all five products in Australia, South America and Africa in 2006. However, the company then retreated from selling any of its products in South America or Africa in 2007, and then abandoned selling dryers and clothes washers in any continent in 2010. As a result of these changes in what products have been sold in what places over time, there are numerous crossings within the full data cube 270 at which cells 275 could be instantiated, but would not be used as there is no data associated with those crossings. By way of example, no appliances of any type were ever sold in Africa in 2013, and therefore, there is no data associated with any of the crossings for any appliance in Africa in 2013.

This characteristic of many data cubes used to organize real world data in which no data exists (or will ever exist) for a subset of the crossings is referred to as "sparsity." Indeed, in data cubes associated with real word data, it is not uncommon for more than half of the crossings to have no data associated with them such that any cells instantiated at those crossings will not contain either measures or pointers. As depicted, there are portions of the volume of the full data cube 270 that include crossings at which cells 275 are instantiated for which data does exist that could be stored directly in those cells 275 as measures and/or that could be pointed to with pointers stored in those cells 275. However, as also depicted, there are portions of the volume of the full data cube 270 that include crossings at which cells 275 could also be instantiated, but for which no data exists.

Again, the depicted example of the full data cube 270 in FIG. 2 is a deliberately simple example selected for purposes of illustration and understanding. Again, it is envisioned that a real world example of the full data cube 270 could be far larger and/or incorporate more dimensions. Indeed, limitations of the OLAP server 300 may make it prohibitively difficult to instantiate the full data cube 270, and this is reflected in the depiction of the data cube data 230 in FIG. 1 with dotted lines. As will be explained in greater detail, such difficulties in instantiating the full data cube 270 may be addressed by providing the OLAP server with indications of cell rules from the rule server 500 to enable the OLAP server to selectively instantiate cells of a data cube.

Returning to FIG. 1, in various embodiments, the rule server 500 incorporates one or more of a processor component 550, a storage 560 and an interface 590 to couple the rule server 500 to the network 999. The storage 560 stores one or more of a control routine 540, rules data 430, rule cube data 530 representing a full rule cube 570, and rule cube data 630 representing one or more reduced-sized rule cubes 670. The control routine 540 incorporates a sequence of instructions operative on the processor component 550 to implement logic to perform various functions.

In executing the control routine 540, the processor component 550 may generate at least one rule cube from the rule data 430. The rule data 430 incorporates indications of one or more cell rules associated with the raw data 130, and accordingly, with a data cube (e.g., the full data cube 270) generated therefrom. The processor component 550 may so generate one or more rule cubes and then transmit the one or more rule cubes to another computing device (e.g., the OLAP server 300 or the client device 700) as an approach to conveying an indication of what cell rules apply to which data cells of a data cube.

Figure 3:
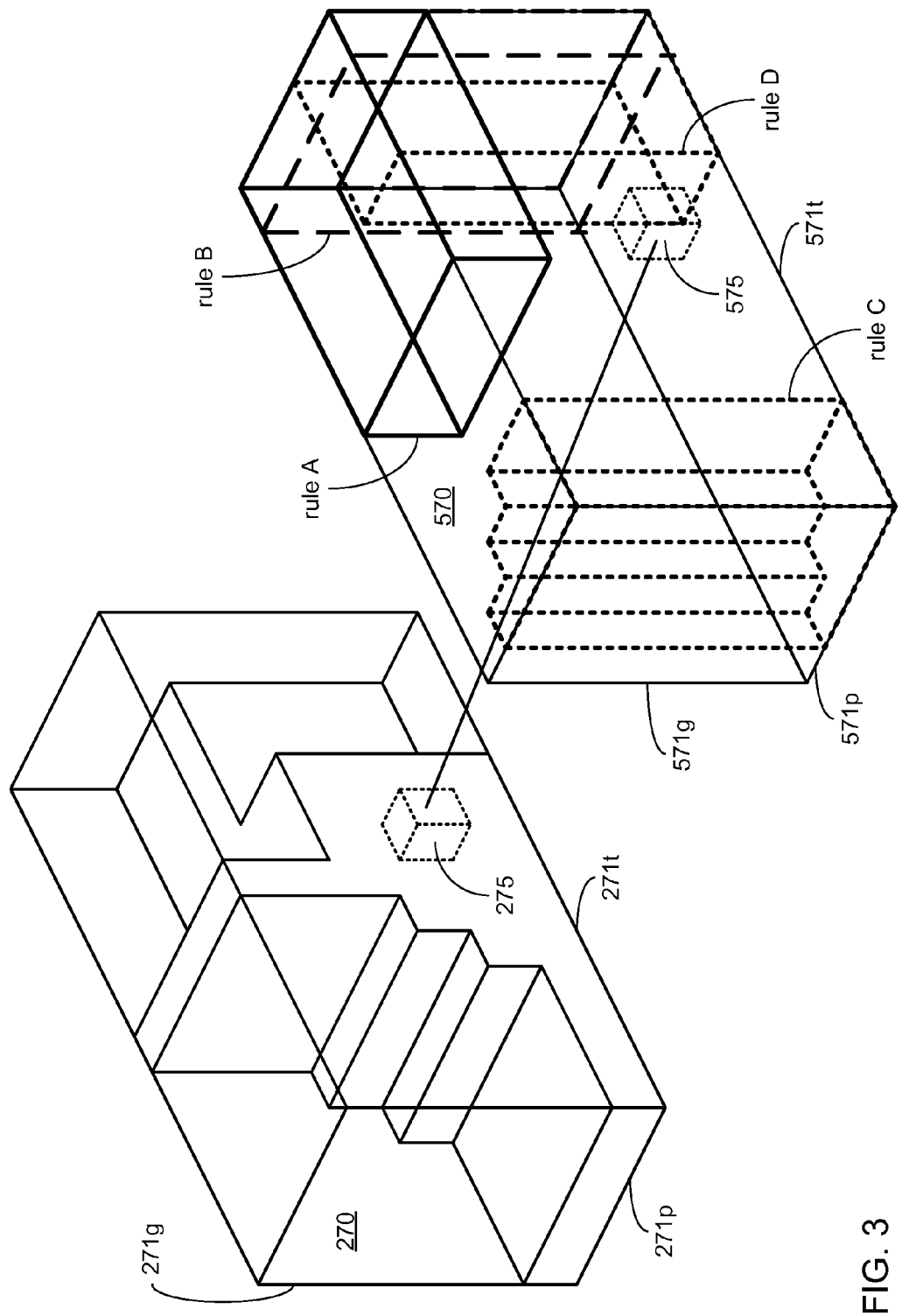
FIG. 3 illustrates an example of correspondence between a full data cube and a full rule cube.

FIG. 3 illustrates an example embodiment of the full rule cube 570 that may be generated by the processor component 550 from the rule data 430. As depicted, the full rule cube 570 corresponds to the full data cube 270 inasmuch as the full rule cube 570 has three dimensions 571g, 571p and 571t that correspond in length to the dimensions 271g, 271p and 271t, respectively. Thus, the full rule cube 570 encompasses the same number of crossings as the full data cube 270 and employs an identical multi-dimensional indexing scheme as the full data cube 270. This creates a one-to-one correspondence between cells 275 of the full data cube 270 containing measures and/or pointers and cells 575 of the full rule cube 570 containing indications of one or more cell rules concerning their corresponding cells of the full data cube 270. Further, the full rule cube 570 and full data cube 270 may also employ the same mapping of this multi-dimensional indexing scheme employed by both to a flat indexing scheme also employed by both. Indeed, the OLAP server 300 and the rule server 500 may exchange information concerning such a mapping to ensure that both employ a common flat indexing scheme with an identical mapping to a common multi-dimensional indexing scheme.

As depicted, the full rule cube 570 incorporates indications of four cell rules labeled A through D. To enable the intersecting cube portions subjected to cell rules A, B and D to be visually distinguishable, each is depicted with a different line style. The one-to-one correspondence of cells 275 of the full data cube 270 to the cells 575 of the full rule cube 570 provides a mechanism to determine which the cells 275 of the full data cube 270 a particular cell rule applies to. Stated differently, a particular cell rule applies to a particular cell 275 of the full data cube 270 if an indication of that particular cell rule is stored in a cell 575 of the full rule cube 570 that corresponds to that particular cell 275.

Thus, a processor component of a computing device to which the rule server 500 transmits the full rule cube 570 may determine which cells 275 of the full data cube 270 are subject to one or more access restrictions by examining corresponding cells 575 of the full rule cube 570 for indications of one or more access restrictions. However, as previously discussed, the full data cube 270 may be sufficiently large in size and/or number of dimensions that it becomes prohibitively difficult to instantiate it. Given that the corresponding full rule cube 570 is of identical dimensions encompassing an identical number of crossings, the full rule cube 570 may also be prohibitively difficult to instantiate, and this is reflected in the depiction of the rule cube data 530 representing the full rule cube 570 in FIG. 1 also with dotted lines. The full rule cube 570 may, therefore, also be prohibitively difficult to transmit to another computing device.

Each of the cell rules A through D indicated in the rule data 430 and by the full rule cube 570 may be any of a variety of rules that define limits on reading, writing or otherwise accessing or altering either a measure or a pointer to detailed data through mathematical, bitwise logical or other operations. By way of example, a cell rule may allow reading of certain measures and/or pointers, but may limit writing or other modification of those measures and/or pointers based on any of a variety of conditions. By way of another example, an cell rule may allow only particular persons and/or computing devices to modify certain measures and/or pointers. Still other limitations are possible that are timing dependent such that specific types of access to certain measures and/or pointers is permitted only during specific times of a day and/or during specific days of a week. Still other types of cell rules will occur to those skilled in the art.

FIGS. 4A-D each illustrate an example of a reduced-sized rule cube, specifically rule cubes 670*a*, 670*b* and 670*cd*. Each of the rule cubes 670*a*, 670*b* and 670*cd* are an instance of the one or more rule cubes 670 represented by the rule cube data 630. Taken together, these reduced-sized rule cubes may be generated and transmitted to another computing device by the processor component 550 to convey indications of the cell rules A through D, instead of attempting to generate and transmit the much larger full rule cube 570 to do so. Each of FIGS. 4A-D provides a visual comparison of the relative size of the full rule cube 570 compared to each of the rule cubes 670*a*, 670*b* and 670*cd*. As previously discussed with regard to FIG. 3, the dimensions 571*g*, 571*p* and 571*t* of the full rule cube 570 correspond to the dimensions 271*g*, 271*p* and 271*t*, respectively, of the full data cube. In a similar manner, in each of FIGS. 4A-C, the dimensions 571*g*, 571*p* and 571*t* of the full rule cube 570, and the dimensions 271*g*, 271*p* and 271*t* of the full data cube 270 also correspond to the dimensions 671*g*, 671*p* and 671*t*, respectively, of each of the reduced-sized rule cubes 670*a*, 670*b* and 670*cd*. However, as becomes clear, each of the rule cubes 670*a*, 670*b* and 670*cd* is considerable smaller than the full rule cube 570. Further, the rule cubes 670*a*, 670*b* and 670*cd*, together, are able to convey the same information as the full rule cube 570, but in a more compact form.

Figure 4A:
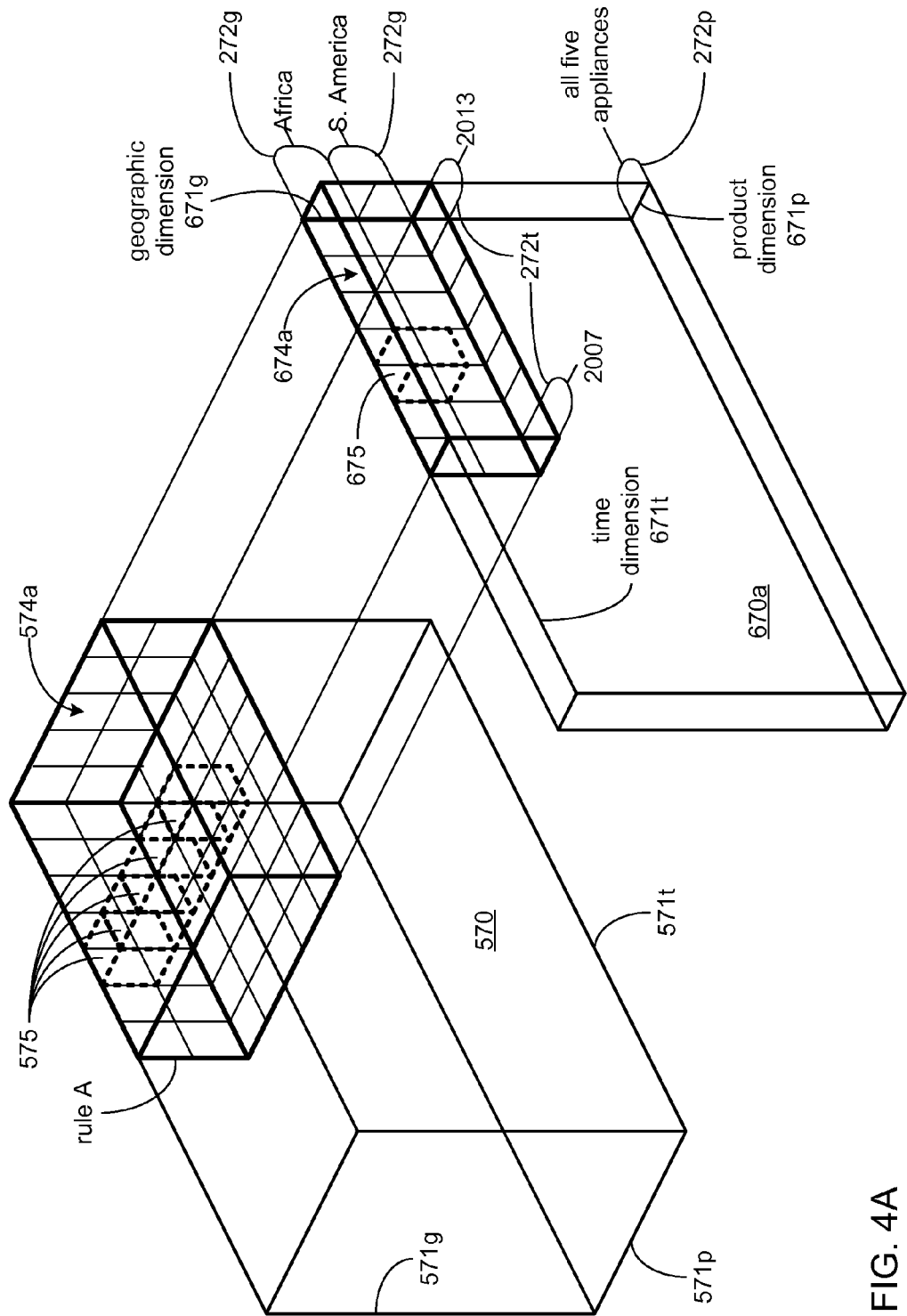
FIGS. 4A, 4B, 4C and 4D each illustrate an example of a reduced-sized rule cube indicating at least one rule applicable to a full data cube.

Turning to FIG. 4A, and also referring to FIG. 2, a contrast is depicted between the manner in which the cells 275 of the full data cube 270 to which cell rule A applies are indicated by each of the full rule cube 570 and the reduced-sized rule cube 670*a*. Cell rule A applies to all cells 275 of the full data cube 270 located at crossings for any of the five appliances sold in Africa or South America during any of the years 2007 through 2013.

To provide an indication of what cells 275 of the full data cube 270 are subjected to cell rule A, all of the cells 575 of the full rule cube 570 within the depicted volume 574*a* must store an indication of cell rule A. A computing device analyzing the full rule cube 570 to determine what cells 275 of the full data cube 270 are subjected to cell rule A would analyze every cell 575 of the full rule cube 570, and would discover that the cells 575 within the volume 574*a* store an indication of cell rule A. Given the one-to-one correspondence between the cells 575 of the full rule cube 570 and the cells 275 of the full data cube 270, the locations of the cells 575 that store an indication of cell rule A would indicate that the cells 275 at those corresponding locations within the full data cube 270 are the ones subjected to cell rule A.

In contrast, to provide an indication of what cells of the full data cube 270 are subjected to cell rule A, only the cells 675 of the rule cube 670*a* within the depicted volume 674*a* need store an indication of cell rule A. A computing device analyzing the rule cube 670*a* to determine what cells 275 of the full data cube 270 are subjected to cell rule A could analyze every cell 675 of the rule cube 670*a*, and would discover that the cells 675 within the volume 674*a* store an indication of cell rule A. However, unlike the one-to-one correspondence of cells between the full data cube 270 and the full rule cube 570, each cell 675 of the rule cube 670*a* corresponds to all cells 275 of the full data cube 270 that share the same location along the time dimension 271*t* and along the geographic dimension 271*g*, and regardless of their location along the product dimension 271*p*.

This one-to-many correspondence of cells arises from the fact that cell rule A is specified as applying to all of the products sold within the specified continents Africa and South America and within the specified years 2007 through 2013. Stated differently, the specification of what cells 275 of the full data cube 270 are subjected to this rule is "wildcarded" along the product dimension 271*p* as a result of there being no limitation on the application of rule A based on specific product members 272*p* along the product dimension 271*p*. As depicted this wildcarding of the product dimension 271*p* is reflected in the fact that the rule cube 670*a* is generated with its product dimension 671*p* having a reduced length of only one product member 6'72*p* that includes all of the product members 272*p* of the full data cube 270, such that this one product member 672*p* might be regarded as a wildcard product member. In contrast to the wildcarding of the product dimension 271*p*, cell rule A is specified as applying to some of the geographic members 272*g* along the geographic dimension 271*g* of the full data cube 270, but not to others. Similarly, cell rule A is specified as applying to some of the temporal members 272*t* along the time dimension 271*t* of the full data cube 270, but not to others.

Thus, while there is a need to differentiate among specific temporal members 272*t* and specific geographic members 272*g* in distinguishing which cells 275 of the full data cube 270 are subject to cell rule A, there is no need to differentiate among specific product members 272*p*. In executing the control routine 500 to generate the rule cube 670*a*, the processor component 550 takes advantage of the lack of need to differentiate among product members 272*p* by generating the rule cube 670*a* to give its product dimension 671*p* a reduced length of only one member (e.g., the wildcard product member 672*p*). However, as will be explained in greater detail, other embodiments are possible in which the processor component 550 takes advantage of the lack of need to differentiate among members of a particular dimension by generating a rule cube in which that dimension is given a further reduced length of zero members.

As a result, the rule cube 670*a* is able to provide an indication of the applicability of rule A to multiple cells 275 of the full data cube 270 with the storage of an indication of rule A in only a single one of its cells 675. In contrast, and as depicted, five of the cells 575 of the full rule cube 570 must store an indication of cell rule A to indicate the same applicability to the same multiple cells 275 of the full data cube 270. More generally, the overall smaller size of the rule cube 670a (1×6×14 members in size) versus the full rule cube 570 (5×6×14 members in size) results in the data structure representing the rule cube 670a in the rule cube data 630 being considerably smaller than the data structure representing the full rule cube 570 in the rule cube data 530. Thus, the representation of the rule cube 670a is considerably smaller, is accordingly far less likely to be prohibitively difficult to generate and store within the storage 560 of the rule server 500, and is further less likely to be prohibitively difficult to transmit to another computing device.

Figure 4B:
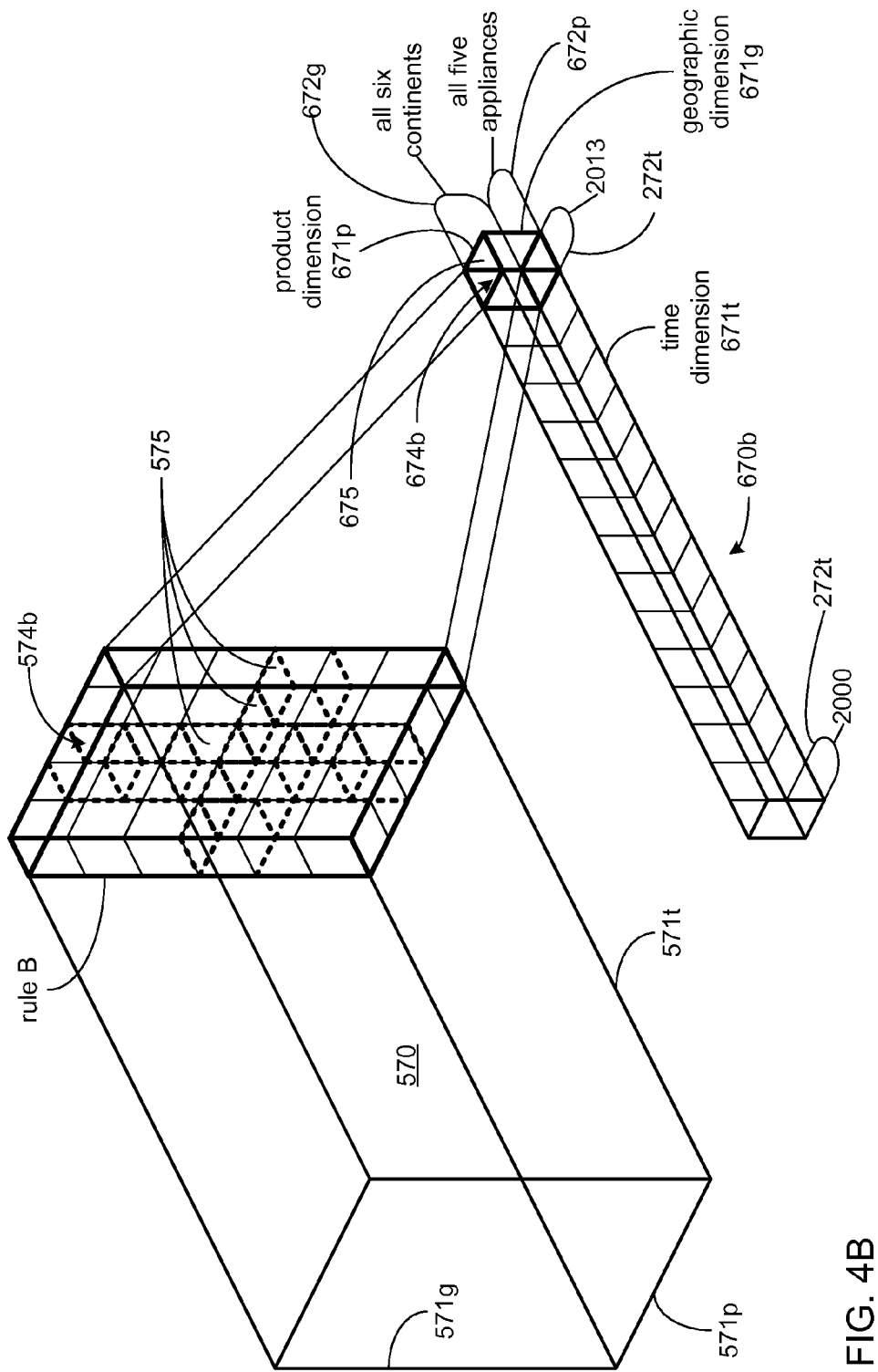

Turning to FIG. 4B, and also referring to FIG. 2, a similar contrast is depicted between the manner in which the cells 275 of the full data cube 270 to which rule B applies are indicated by each of the full rule cube 570 and the reduced-sized rule cube 670b. Cell rule B applies to all cells 275 of the full data cube 270 located at crossings for any of the five appliances sold in any of the six continents during the year 2013.

To provide an indication of what cells 275 of the full data cube 270 are subjected to cell rule B, all of the cells 575 of the full rule cube 570 within the depicted volume 574b must store an indication of rule B. A computing device analyzing the full rule cube 570 to determine what cells 275 of the full data cube 270 are subjected to rule B could analyze every cell 575 of the full rule cube 570, and would discover that the cells 575 within the volume 574b store an indication of cell rule B. Again, the locations of the cells 575 that store an indication of rule B would indicate that the cells 275 at corresponding locations within the full data cube 270 are the ones subjected to cell rule B.

In contrast, to provide an indication of what cells of the full data cube 270 are subjected to cell rule B, only the single cell 675 of the rule cube 670b within the depicted volume 674b need store an indication of cell rule B. A computing device analyzing the rule cube 670b to determine what cells 275 of the full data cube 270 are subjected to cell rule B could analyze every cell 675 of the rule cube 670b, and would discover that the one cell 675 within the volume 674b stores an indication of cell rule B. Unlike the one-to-one correspondence of cells between the full data cube 270 and the full rule cube 570, each cell 675 of the rule cube 670b corresponds to all cells 275 of the full data cube 270 that share the same location along the time dimension 271t, and regardless of their location along either of the geographic dimension 271g or the product dimension 271p.

Not unlike the rule cube 670a, in the rule cube 670b, this one-to-many correspondence of cells arises from the fact that cell rule B is specified as applying to all of the products sold within all of the continents, with only temporal members along the time dimension 271t being specified. Stated differently, the specification of what cells 275 of the full data cube 270 are subjected to this rule is wildcarded along both of the geographic dimension 271g and the product dimension 271p as a result of there being no limitation on the application of cell rule B based on specific product members 272p along the product dimension 271p or based on specific geographic members 272g along the geographic dimension 271g.

Again, such wildcarding is reflected in the lengths of the dimensions of the rule cube 670b. As depicted, the wildcarding of the geographic dimension 271g is reflected in the fact that the geographic dimension 671g of the rule cube 670b has a reduced length of only one geographic member 672g that includes all of the geographic members 272g of the full data cube 270 (e.g., a wildcard geographic member). Similarly, the wildcarding of the product dimension 271p is reflected in the fact that the product dimension 671p of the rule cube 670b has a reduced length of only one geographic member 6'72p that includes all of the product members 272p of the full data cube 270 (e.g., a wildcard geographic member). In contrast to the wildcarding of the geographic dimension 271g and the product dimension 271p, cell rule B is specified as applying to some of the temporal members 272t along the time dimension 271t of the full data cube 270, but not to others.

Thus, while there is a need to differentiate among specific temporal members 272t in distinguishing which cells 275 of the full data cube 270 are subject to cell rule B, there is no need to differentiate among specific geographic members 272g or specific product members 272p. In executing the control routine 500 to generate the rule cube 670a, the processor component 550 takes advantage of the lack of need to differentiate among geographic members 272g and product members 272p by generating the rule cube 670b to give both its geographic dimension 671g and its product dimension 671p a reduced length of only one member (e.g., the wildcard geographic member 672g and the product member 6'72p, respectively). Again, however, other embodiments are possible in which the wildcarding of the geographic dimension 271g and the product dimension 271p would be reflected in reduced lengths for the geographic dimension 671g and the product dimension 671p of zero members.

As a result, the rule cube 670b is able to provide an indication of the applicability of cell rule B to all of the cells 275 of the full data cube 270 to which it is intended to apply with the storage of an indication of cell rule B in only a single one of its cells 675. In contrast, and as depicted, the entire volume 574b of five by six cells 575 of the full rule cube 570 must store an indication of cell rule B to indicate the same applicability to the same multiple cells 275 of the full data cube 270. More generally, the overall smaller size of the rule cube 670b (1×1×14 members in size) versus the full rule cube 570 (5×6×14 members in size) results in the data structure representing the rule cube 670b in the rule cube data 630 being considerably smaller than the data structure representing the full rule cube 570 in the rule cube data 530.

Figure 4C:
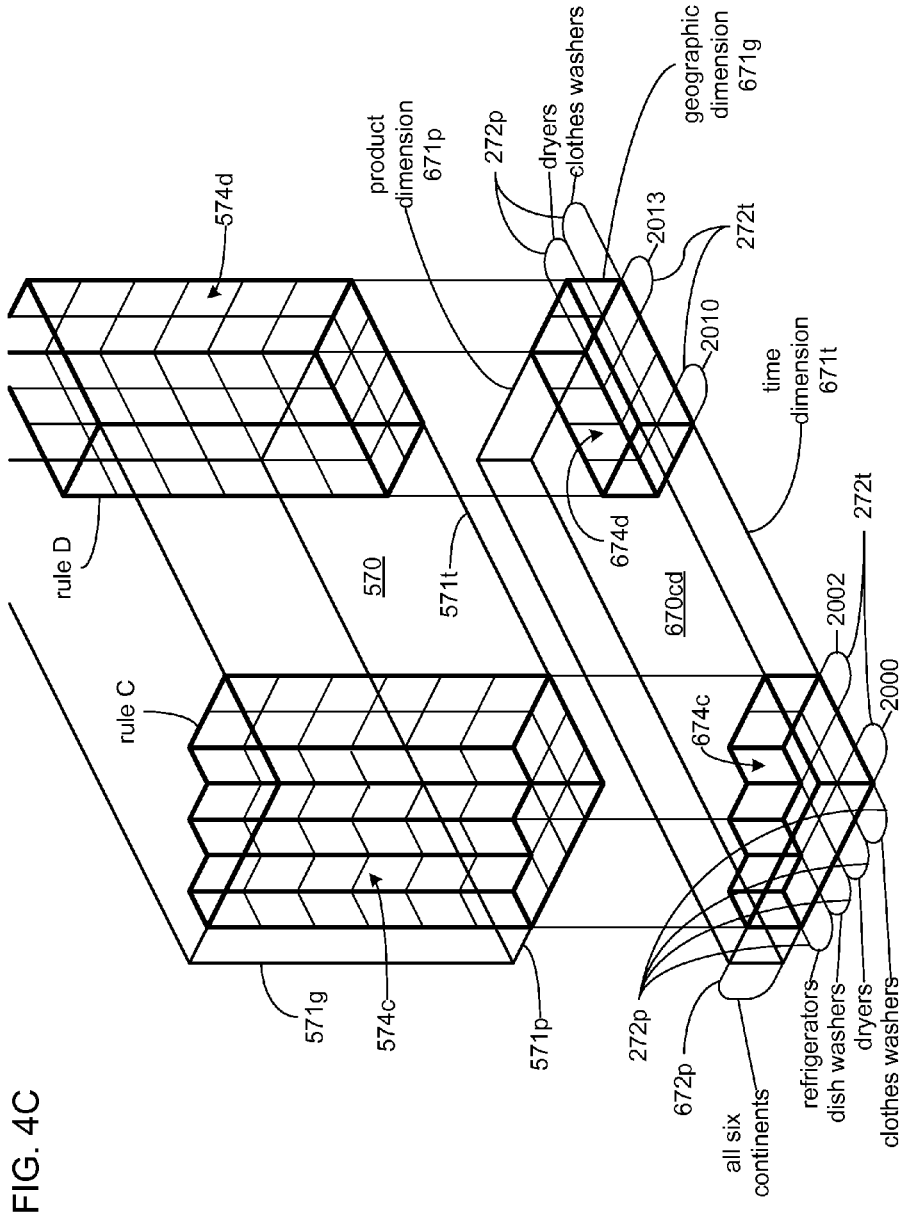

Turning to FIG. 4C, and also referring to FIG. 2, another example contrast is depicted between the manner in which the full rule cube 570 and a reduced-sized rule cube 670cd indicates applicability of cell rules. However, unlike the rule cubes 670a and 670b that each provided an indication of applicability of only one cell rule to cells 275 of the full data cube 270, the rule cube 670cd provide such an indication for two rules, specifically cell rules C and D.

In some embodiments, the processor component 550, in executing the control routine 540, may combine indications of applicability of more than one cell rule into a single reduced-sized rule cube if those cell rules have the same dimensional wildcarding configuration. Stated differently, two or more cell rules may be combined if the combination of dimensions that are wildcarded and not wildcarded in their specifications of what cells 275 of the full data cube 270 they each apply to is the same.

By way of example, and as depicted, cell rule C applies to all cells 275 of the full data cube 270 located at crossings for clothes washers and dryers sold in any of the six continents from 2000-2002, for dishwashers sold in any of the six continents from 2000-2001, and for refrigerators sold in any of the six continents during 2000. Further, cell rule D applies to all cells 275 of the full data cube 270 located at crossings for clothes washers and dryers sold in any of the six continents from 2010 to 2013. Thus, both cell rules C and D wildcard the geographic dimension 271g of the full data cube 270, but not the product dimension 271p and not the time dimension 271t.

The fact that both cell rules C and D have the same dimensional wildcard configuration enables the generation of the rule cube 670cd with a compact size in which its geographic dimension 671g has a reduced length of only one geographic member 672g that includes all of the geographic members 272g of the full data cube 270 (e.g., a wildcard geographic member). In contrast, attempting to combine one or both of cell rules C and D in the same rule cube with cell rule A would not allow for any dimension to be reduced in length to only one member, since the specification for what cells 275 of the full data cube 270 are subject to cell rule A does not wildcard the geographic dimension 271g.

As a result, the rule cube 670cd is able to provide an indication of the applicability of both cell rules C and D to all of the cells 275 of the full data cube 270 to which each is intended to apply with the storage of indications of cell rules C and D in fewer cells 675 than the number of cells 575 required to provide the same indications in the full rule cube 570. The overall smaller size of the rule cube 670cd (5×1×14 members in size) versus the full rule cube 570 (5×6×14 members in size) results in the data structure representing the rule cube 670cd in the rule cube data 630 being considerably smaller than the data structure representing the full rule cube 570 in the rule cube data 530.

Figure 4D:
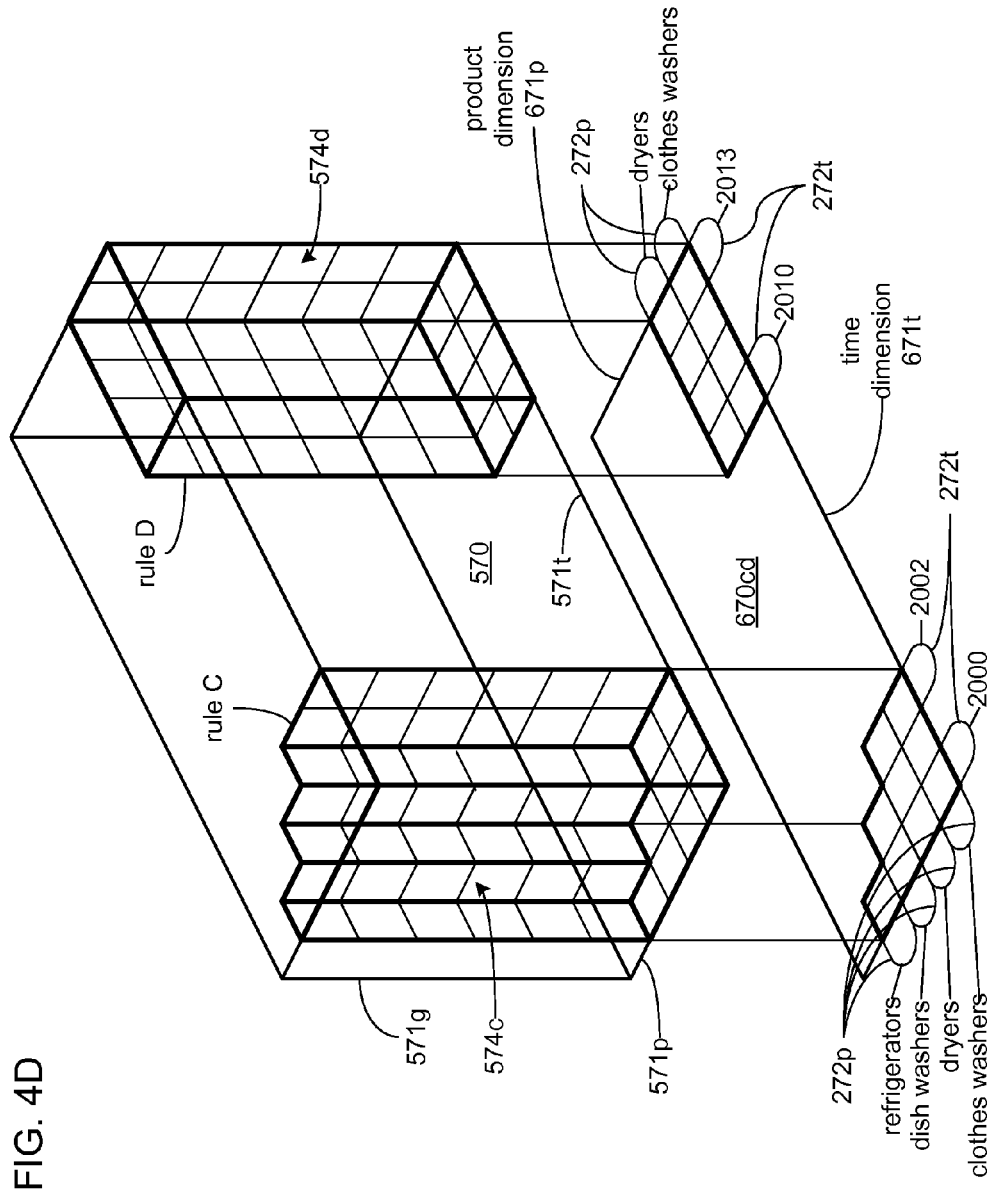

Turning to FIG. 4D, and also referring to FIG. 2, an alternate example embodiment of the reduced-sized rule cube 670cd is presented, and in another example contrast between the manner in which the full rule cube 570 and a reduced-sized rule cube indicates applicability of cell rules. Like the example embodiment of the rule cube 670cd of FIG. 4C, this alternate example embodiment of FIG. 4D provides an indication of applicability of both cell rules C and D to cells 275 of the full data cube 270.

Also like the rule cube 670cd of FIG. 4C, geographic dimension 671g of the rule cube 670cd of FIG. 4D is also of a reduced length. However, unlike the reduced length of one member (e.g., the wildcard geographic member 672g) of the geographic dimension 671g of the rule cube 670cd of FIG. 4C, the geographic dimension 671g of the rule cube 670cd of FIG. 4D is reduced to a length of zero members. Stated differently, the length of the geographic dimension 671g of the rule cube 670cd of FIG. 4D is reduced to extent of being omitted by the processor component 550 in generating the rule cube 670cd.

Returning to FIG. 1, the generation of multiple reduced-sized rule cubes (e.g., the rule cubes 670a, 670b and 670cd) may be performed in parallel. More specifically, a separate thread of processing may be allocated to the generation of each reduced-sized rule cube. In some embodiments, all of those threads may be executed by the processor component 550 or multiple ones of the processor component 550 of the rule server 500. In other embodiments, at least a subset of those threads may be allocated to one or more other computing devices (not shown) that may be overseen and/or coordinated by the processor component 550.

Following the generation of the reduced-sized rule cubes 670a, 670b and 670cd, the processor component 550 of the rule server 500 may operate the interface 590 to transmit the rule cube data 630 representing these rule cubes to the client device 700. Again, the processor component 550 may transmit the rule cube data 630 to the client device 700 in response to a request therefrom for an indication of rules applicable to the cells 275 of the full data cube 270. Alternatively or additionally, the processor component 550 may transmit the rule cube data 630 to the OLAP server 300 to enable the OLAP server 300 to employ the indications of rules of the rule cube data 630 in selectively instantiating cells of a data cube meant to be transmitted to the client device 700.

Indeed, the processor component 350 of the OLAP server 300 may employ the indications of rules to enable generating a smaller data cube 370 that represents a subset of the full data cube 270. The reduced size of the data cube 370 may be due to the lack of instantiation by the processor component 350 of cells that would contain measures and/or pointers to which the client device 700 (or a particular person using the client device 700) is not permitted to have any access. More precisely, before instantiating each cell of the data cube 370, the processor component 350 may analyze each of the rule cubes 670 to determine whether there is a cell rule that applies to that cell of the data cube 370 that may serve as a basis for not instantiating that cell. In some embodiments, such analysis of each of the rule cubes 670 for each cell of the data cube 370 that might be instantiated may be performed in parallel on separate threads that may be executed by the processor component 350 or multiple ones of the processor components 350.

In various embodiments, the client device 700 incorporates one or more of a processor component 750, a storage 760, controls 720, a display 780 and an interface 790 to couple the client device 700 to the network 999. The storage 760 stores one or more of a control routine 740, the rule cube data 630 representing the rule cubes 670, and the data cube data 330 representing the data cube 370. The control routine 740 incorporates a sequence of instructions operative on the processor component 750 to implement logic to perform various functions.

In executing the control routine 740, the processor component 750 may operate the controls 720 and/or the display 780 to provide a user interface by which one or more commands may be received to request data from the OLAP server 300. In response to receiving such input, the processor component 750 may first operate the interface 790 to transmit such a request to the rule server 500 via the network 999 for indications of what cell rules apply to the cells 275 of the full data cube 270. As just discussed, the rule server 500 provides the client device 700 with the rule cube data 630 via the network 999, thereby conveying the rule cubes 670 (e.g., 670a, 670b and 670cd) to the client device 700.

The processor component 750 may analyze each of the rule cubes 670 to determine which cells 275 are specified by the rule cubes as subject to a cell rule indicated by one or more of the rule cubes 670. By way of example, for a particular cell 275, the processor component 750 may employ its location as specified by members along the geographic dimension 271g, the product dimension 271p and the time dimension 271t to determine the corresponding location within the rule cube 670a. Since the geographic dimension 271g is wildcarded by cell rule A of the rule cube 670a, all members 272g along the geographic dimension 271g are effectively included by cell rule A. As a result, where exactly the cell 275 is located along the geographic dimension 271g does not control whether cell rule A would apply to the cell 275. However, since the product dimension 271p is not wildcarded by cell rule A, the product dimension 271p of the full data cube 270 and the product dimension 671p of the rule cube 670a are of the same length, and are made up of identical members. Similarly, since the time dimension 271t is not wildcarded by cell rule A, the time dimensions 271t and 671t are also of the same length and are also made up of identical members. Thus, the processor component 750 employs the location of the cell 275 along the product dimension 271*p* and the time dimension 271*t* of the full data cube 270 to identify the corresponding cell 675 in the rule cube 670*a*. The processor component 750 then checks the contents of that corresponding cell 675 in the rule cube 670*a* to determine whether there is an indication of at least one cell rule (e.g., cell rule A) stored therein. If there is such an indication, then the cell rule(s) indicated within that corresponding cell 675 is deemed to apply to the cell 275.

The processor component 750 similarly determines what the corresponding cells 675 are in each of the rule cubes 670*b* and 670*cd*, and similarly checks the contents of those corresponding cells 675 in each of the rule cubes 670*b* and 670*cd* to determine whether there is an indication of a cell rule that applies to the cell 275. More specifically, turning to the rule cube 670*b*, since cell rule B wildcards both the geographic dimension 271*g* and the product dimension 271*p*, all members 272*g* and 272*p* along those dimensions are effectively included by cell rule B. Therefore, the processor component 750 employs only the location of the cell 275 along the time dimension 271*t* to identify the corresponding cell 675 in the rule cube 670*b*. If that corresponding cell 675 in the rule cube 670*b* stores an indication of at least one cell rule (e.g., cell rule B), then the cell rule(s) indicated within that corresponding cell 675 is deemed to apply to the cell 275. Turning to turning to the rule cube 670*cd*, since cell rules C and D both wildcard the geographic dimension 271*g*, all members 272*g* along the geographic dimension 271*g* are effectively included by both cell rules C and D. Therefore, the processor component 750 employs the location of the cell 275 along the product dimension 271*p* and the time dimension 271*t*, but not the geographic dimension 271*g*, to identify the corresponding cell 675 in the rule cube 670*cd*. If that corresponding cell 675 in the rule cube 670*b* stores an indication of at least one cell rule (e.g., one of cell rules C or D), then the cell rule(s) indicated within that corresponding cell 675 is deemed to apply to the cell 275.

What cell rule(s) apply to the cell 275 represents a union of the indications stored in the corresponding cells 675 within each of the rule cubes 670*a*, 670*b* and 670*cd*. The cell 275 may be subject to no cell rules, may be subject to only cell rule indicated by a corresponding cell 675 within one of the rule cubes 670, or may be subject to multiple cell rules indicated by one or more corresponding cells 675 of one or more of the rule cubes 670. The processor component 750 may employ such a combined indication of what cell rule(s) apply to the cell 275 (if any) in determining whether to take any of a variety of actions with regard to that cell 275. By way of example, the processor component 750 may selectively include the cell 275 in a request to the OLAP server 300 for a portion of the full data cube 270 (e.g., the data cube 370) based on what cell rule(s) apply to that cell 275. Alternatively, where the client device 700 has already been provided with at least a portion of the full data cube 270, the processor component 750 may selectively provide access to the cell 275 based on what cell rule(s) apply. As yet another alternative, the processor component 750 may selectively modify a measure stored within the cell 275 based on what cell rule(s) apply.

The processor component 750 may operate the display 780 to present an operator of the client device 700 with an indication of what those cell rules are and/or what cells 275 are subject to cell rules. In particular, the processor component 750 may provide the operator with an indication of what cells are subject to cell rules imposing an access restriction that the client device 700 and/or the operator do not meet. By providing such information to the operator, the operator may be encouraged to request only a portion of the full data cube 270 of somewhat limited size, thereby alleviating the need to attempt to instantiate and/or transmit the entirety of the full data cube 270 to the client device 270. Alternatively or additionally, the processor component 750 may limit any request subsequently made for the full data cube 270 to only portions that the rule cubes 670 indicate the client device 700 is authorized to receive such that the processor component 750 avoids requesting the entirety of the full data cube 270.

It should be noted that, despite the specific depiction and discussion of the OLAP server 300 generating the data cube data 330 representing the data cube 370 and the rule server 500 separately generating the rule cube data 630 representing the rule cubes 670, other embodiments are possible in which a single computing device performs both of these functions. It should also be noted that, despite the specific depiction of the client device 700 providing a user interface (UI) by which an operator may specify a portion of the full data cube 270 to request, other embodiments are possible in which the OLAP server 300 and/or the rule server 500 directly provide such a UI and thereby directly accept such operator input. In such embodiments, access restrictions may be based on the identity of the operator rather than what client device is requesting a data cube.

Each of the processor components 150, 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

In various embodiments, each of the storages 160, 360, 560 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390, 590 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1 xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
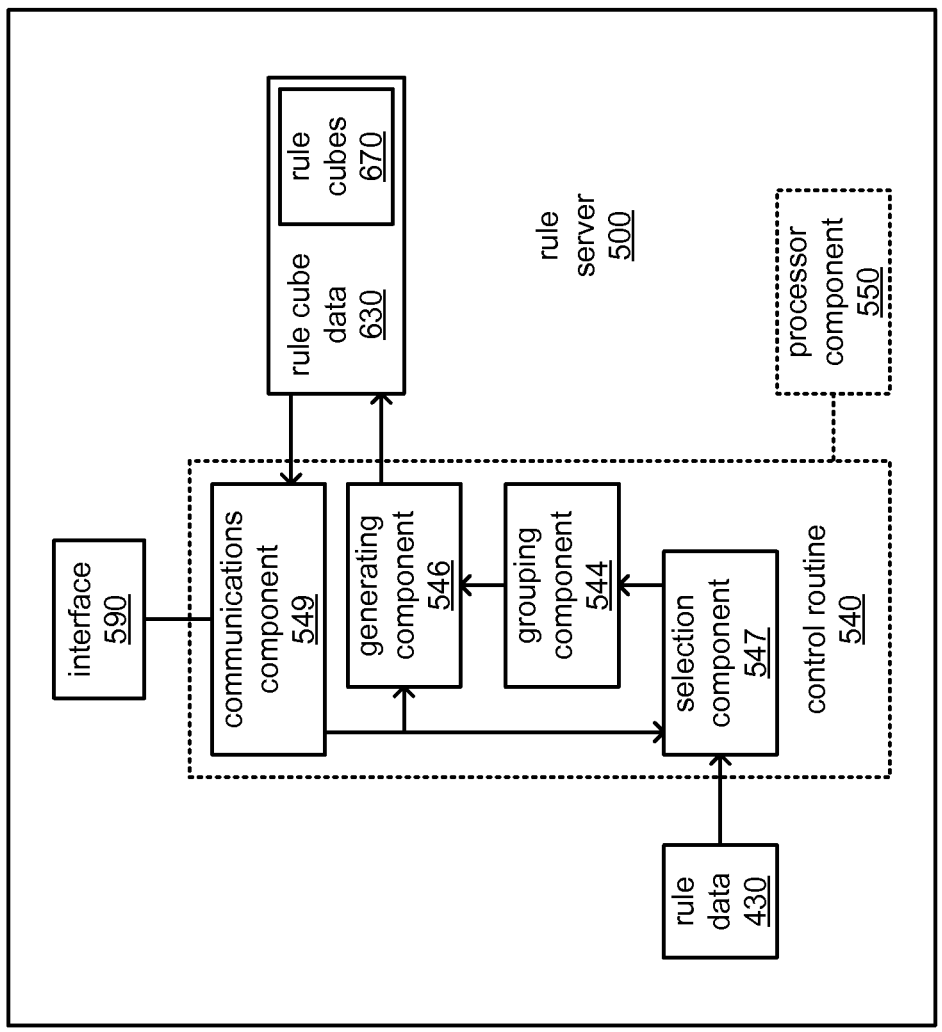
FIGS. 5 and 6 illustrate examples of operating environments for portions of an online analytical processing system.
Figure 6:
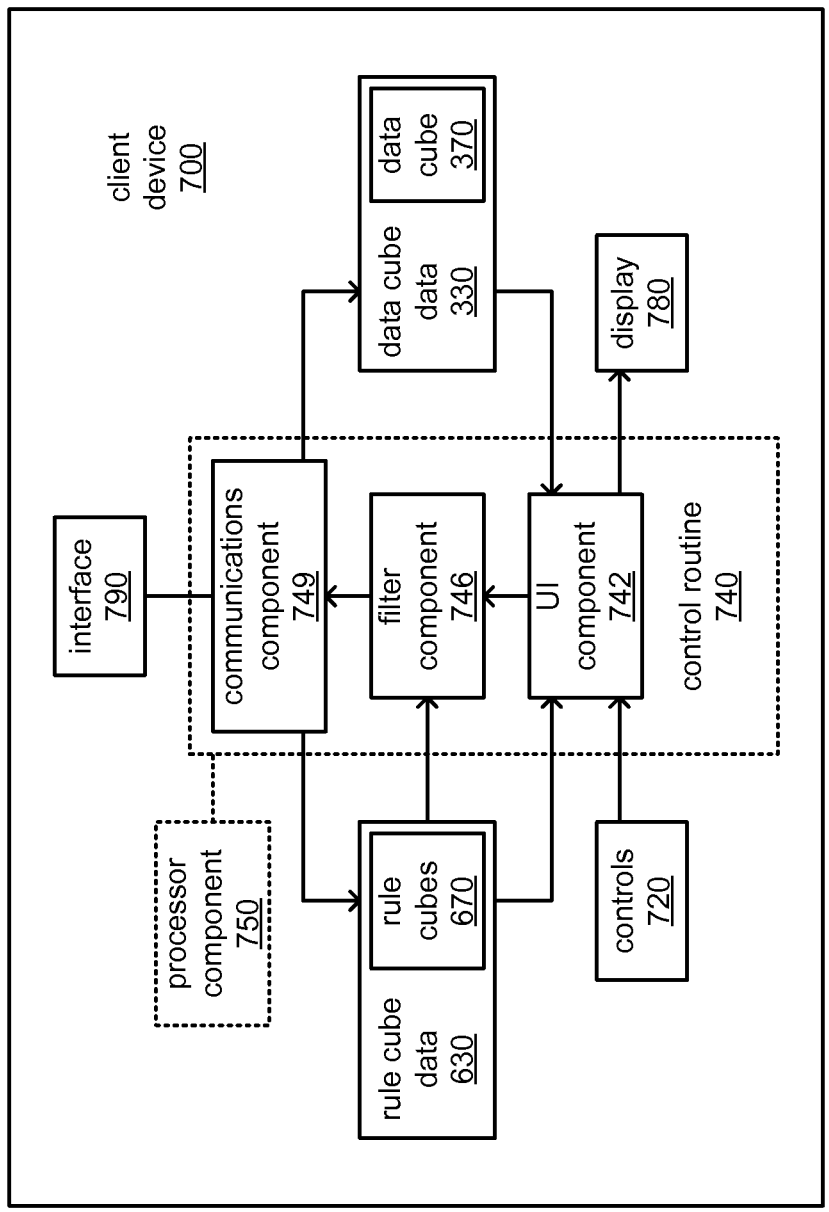

FIGS. 5 and 6 each illustrate a block diagram of a portion of an embodiment of the OLAP system 1000. More specifically, FIG. 5 depicts aspects of the operating environment of one embodiment of the rule server 500 in which the processor component 550, in executing the control routine 540, may generate one or more reduced-sized rule cubes 670 (e.g., the rule cubes 670*a*, 670*b* and 670*cd*), and then transmit them to the client device 700 in response to a request for an indication of cell rules therefrom. FIG. 6 depicts aspects of the operating environment the client device 700 in which the processor component 750, in executing the control routine 740, transmits the request for an indication of cell rules to the rule server 500 and receives the reduced-sized rule cubes therefrom.

As recognizable to those skilled in the art, the control routines 140, 340, 540 and 740, including the components of which each is composed, are selected to be operative on whatever type of processor or processors that are selected to implement applicable ones of the processor components 150, 350, 550 or 750. In various embodiments, each of the control routines 140, 340, 540 and 740 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 350, 550 or 750. Where one or more device drivers are included, those device drivers may provide support for any of a variety of other components, whether hardware or software components, of corresponding ones of the computing devices 100*a-x*, 300, 500 or 700.

Referring to both FIGS. 5 and 6, the control routines 540 and/or 740 may include a communications component 549 and/or 749 executable by the processor component 550 and/or 750 to operate the interface 590 and/or 790, respectively, to transmit and receive exchange communications via the network 999 as has been described. Among the communications may be those conveying at least pieces of the raw data 130, the data cube data 330 and/or the rule cube data 630 among the computing devices and/or servers 100, 300, 500 and/or 700 via the network 999. As will be recognized by those skilled in the art, the communications components 549 and 749 are selected to be operable with whatever type of interface technology is selected to implement the interfaces 590 and 790, respectively.

Turning more specifically to FIG. 5, the control routine 540 may include a selection component 547 executable by the processor component 550 to receive indications of a request from another computing device (through the communications component 549) for an indication of cell rules applicable to only a portion of the full data cube 270. In response to receiving such a request, the selection component 547 limits retrieval of cell rules from the rule data 430 to rules applicable only to the portion of the full data cube 270 specified in the request. However, if the request received from the other computing device is for indications of cell rules applicable to the entirety of the full data cube 270, then the selection component 547 retrieves indications of all cell rules applicable to the full data cube 270 from the rule data 430. The selection component 547 may relay indications of whatever rules it retrieves to the grouping component 544.

The control routine 540 may include a grouping component 544 executable by the processor component 550 to group together ones of the cell rules retrieved from the rule data 430 that have the same dimensional wildcarding configuration. The grouping component 544 provides any groups of cell rules, along with any cell rules that have not been grouped, to the generating component 546.

The control routine 540 may include a grouping component 546 executable by the processor component 550 to generate one or more reduced-sized rule cubes (e.g., one or more of the rule cubes 670*a*, 670*b* and 670*cd*) from any cell rules grouped by the grouping component 544 and/or any cell rules retrieved from the rule data 430 that have not been grouped. In so doing, the generating component 546 generates the rule cube data 630 which represents the rule cubes 670 for transmission by the communications component 549 to another computing device.

Turning more specifically to FIG. 6, the control routine 740 may include a user interface (UI) component 742 executable by the processor component 750 to operate the controls 720 and/or the display 780 to provide a user interface for an operator of the client device 700. Upon receipt of the rule cube data 630 representing one or more reduced-sized rule cubes 670, the UI component 742 may operate the display 780 to generate an indication to the operator of what cell rules apply to cells 275 of the full data cube 270, or at least a portion thereof. Such an indication to the operator may be accompanied by an invitation for the operator to specify a portion of the full data cube 270 to request from the OLAP server 300. Upon receipt of an indication via the controls 720 (or via another mechanism) of a specification of what portion of the full data cube 270 to request, the UI component may convey an indication of that specification to the filter component 746. Upon subsequent receipt of data cube data, such as the data cube data 330 representing the data cube 370, which may be a subset of the full data cube 270, the UI component 742 may operate the display 780 to visually present at least a portion of that data cube data.

The control routine 740 may include a filter component 746 executable by the processor component 750 to employ indications of cell rules applicable to at least a portion of the full data cube 270 to modify a request by an operator of the client device 700 for at least a portion of the full data cube 270. In so modifying the request, the filter component 746 removes from the request any portion of the full data cube 270 that the client device 700 and/or the particular operator thereof are not authorized to access according to the indication of cell rules provided by the rule cube data 330. Following such filtering, the filter component 746 may relay the request to the communications component 749 to transmit to the OLAP server 300 via the interface 790.

Figure 7:
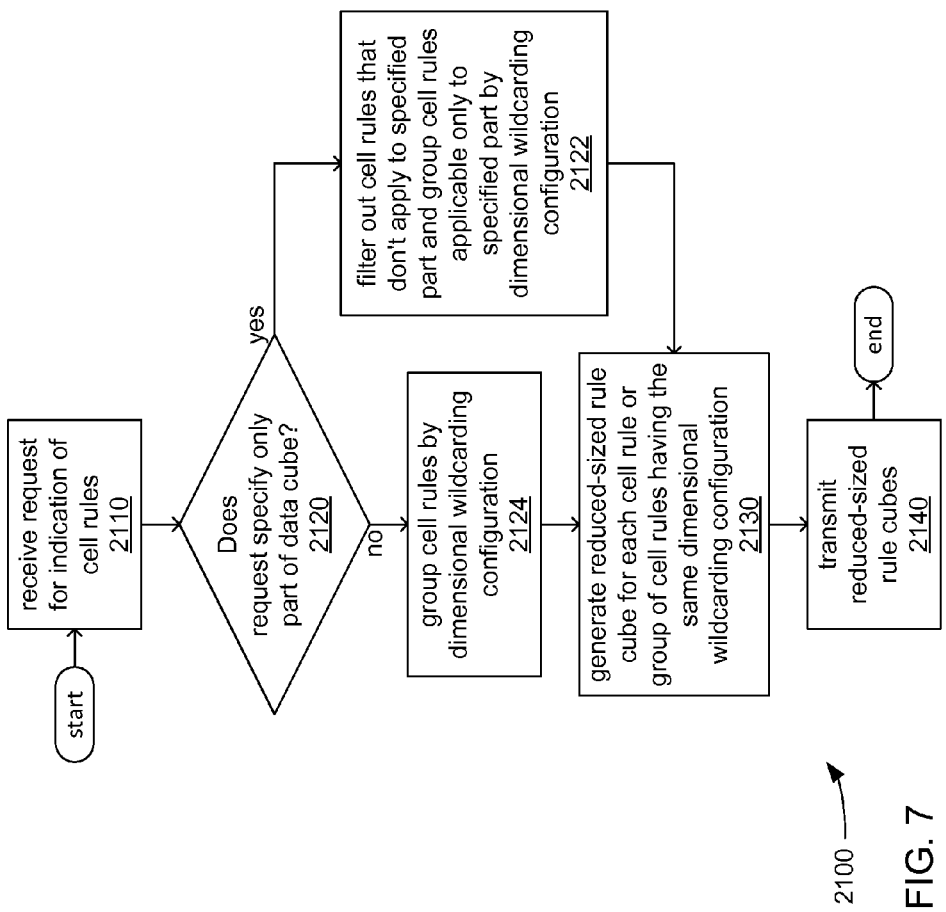
FIG. 7 illustrates an example of a first logic flow.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the control routine 540, and/or performed by other component(s) of the rule server 500.

At 2110, a rule server of an online analytical processing (OLAP) system (e.g., the rule server 500 of the OLAP system 1000) receives a request for an indication of cell rules applicable to a data cube (e.g., cell rules applicable to cells 275 of the full data cube 270). As has been discussed, a client device (e.g., the client device 700) may request such an indication of cell rules to employ in determining what portion(s) of the data cube to request from an OLAP server.

At 2120, a processor component of the rule server performs a check of whether the request specifies cell rules applicable to only a portion of that data cube specified in the request. If the request is associated with only a portion, then the processor component filters out cell rules not applicable to the specified portion and groups cell rules applicable only to the specified portion based on having similar dimensional wildcarding configurations at 2122. However, if the request is associated with the entirety of that data cube, then the processor component groups cell rules applicable to any portion of that data cube based on having similar dimensional wildcarding configurations at 2124.

At 2130, the processor component generates one or more reduced-sized rule cubes, one for each cell rule and/or for each group of cell rules having the same dimensional wildcarding configuration. At 2140, the processor component transmits the one or more reduced-sized rule cubes to whatever device from which the request for an indication of cell rules was originally received.

Figure 8:
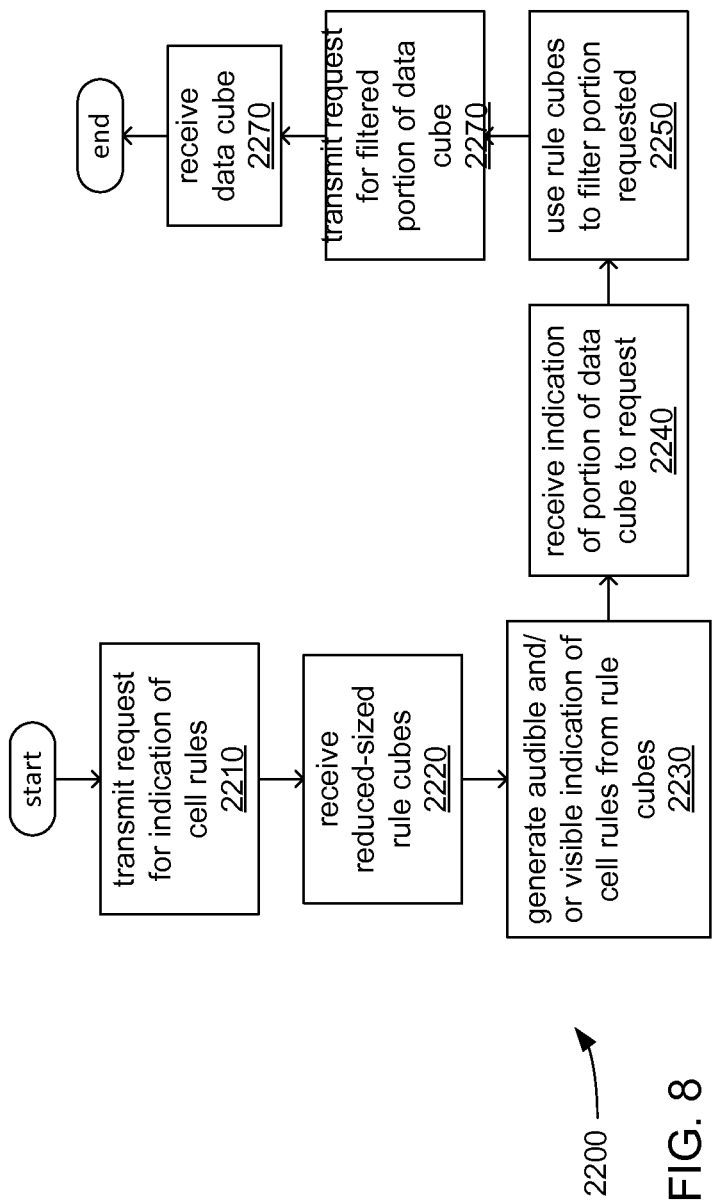
FIG. 8 illustrates an example of a second logic flow.

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 750 in executing at least the control routine 740, and/or performed by other component(s) of the client device 700.

At 2210, a processor component of a client device of an OLAP system (e.g., the processor component 750 of the client device 700 of the OLAP system 1000) operates an interface (e.g., the interface 790 to the network 999) to transmit a request for an indication of cell rules applicable to a data cube (e.g., the full data cube 270) to a rule server (e.g., the rule server 500). At 2220, the client device receives reduced-sized rule cubes in response to that transmitted request.

At 2230, the processor component operates one or more components of a user interface (e.g., the controls 720 and/or the display 780) to generate an audible and/or visual indication of the cell rule(s) indicated in each of the received rule cubes to an operator of the client device 700. The processor component then awaits a response from the operator. At 2240, the an indication of what portion of the data cube to request is received from the operator (e.g., from monitoring of the controls 720).

At 2250, the processor component uses the received rule cubes to filter the request for the portion of the data cube to remove from that request any portion of the data cube that the cell rules indicate a lack of authorization of the client device to have access. As has been discussed, this may be done despite having provided the operator of the client device with the opportunity to specify a portion of the data cube that does not include a portion to which the client device and/or the operator have no right to access, at all.

At 2260, the processor component operates the interface to transmit the now filtered request for a portion of the data cube. At 2270, the requested portion of the data cube is received.

Figure 9:
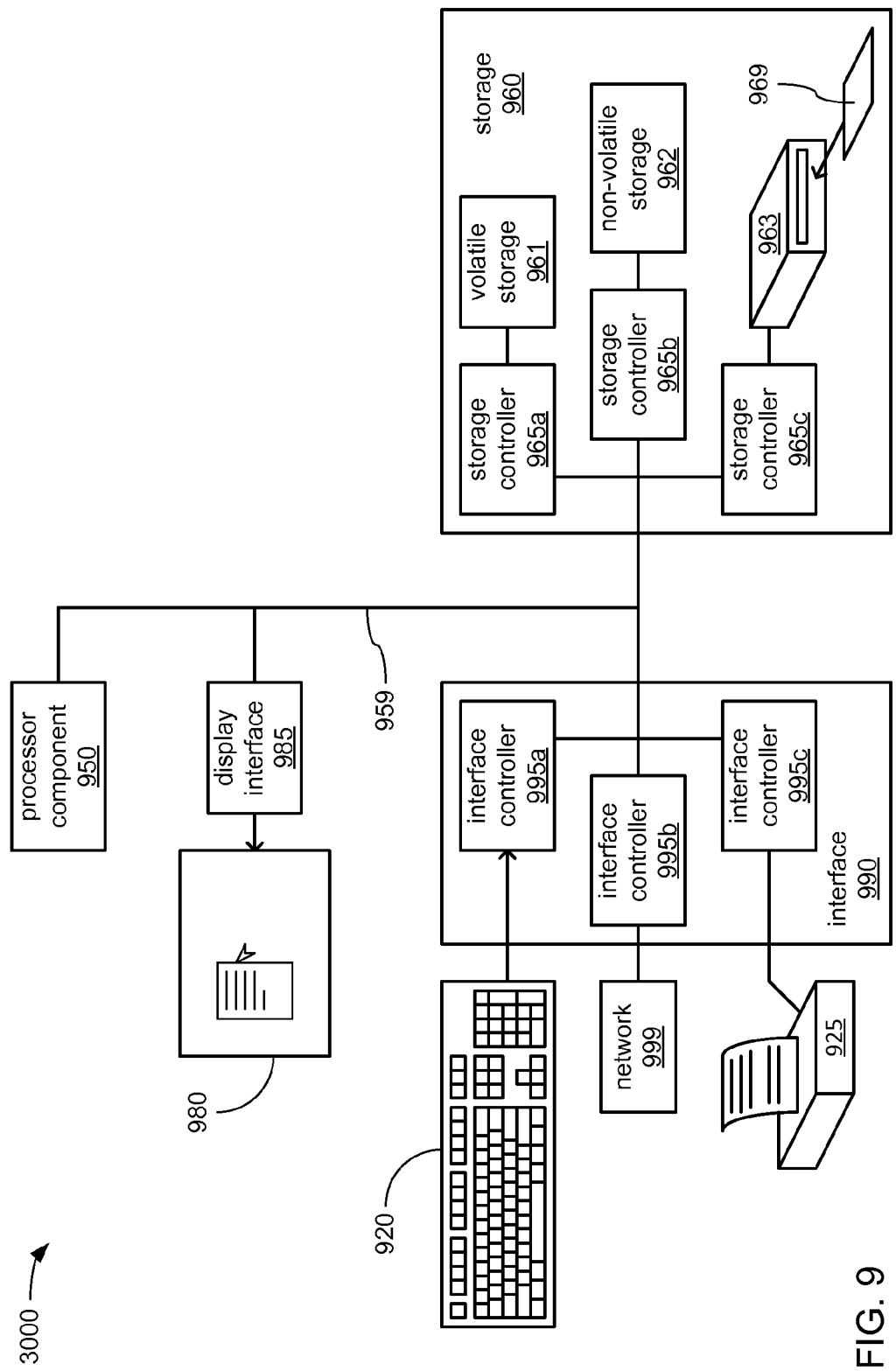
FIG. 9 illustrates an example of a processing architecture.

FIG. 9 illustrates an embodiment of a processing architecture 3000 suitable for implementing various embodiments as previously described. More specifically, the processing architecture 3000 (or variants thereof) may be implemented as part of one or more of the computing devices and/or servers 100, 300, 500 or 700. It should be noted that components of the processing architecture 3000 are given reference numbers in which the last two digits correspond to the last two digits of reference numbers of at least some of the components earlier depicted and described as part of the computing devices and/or servers 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display 980 and a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of coupling 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150, 350, 550 and/or 750) may include any of a wide variety of commercially available processors, employing any of a wide variety of technologies and implemented with one or more cores physically combined in any of a number of ways.

As previously discussed, the storage 960 (corresponding to the storages 160, 360, 560 and/or 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interfaces 190, 390, 590 and/or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a touch screen (e.g., the depicted example display 980, corresponding to the touch screen 580), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the display 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop®, for example, is an open-source software framework for distributed computing.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including instructions operable to cause a computing device to perform operations including:
    select a first cell rule applicable to a data cube to include in a rule cube associated with the data cube based on applicability of the first cell rule to a selected portion of the data cube, the first cell rule comprising at least one of restricting read access to at least one cell of the data cube, restricting write access to the at least one cell, restricting access to change a measure or a pointer of the at least one cell, restricting a degree of change in at least one measure stored at the at least one cell during a calculation, imposing a minimum value on the at least one measure, and imposing a maximum value on the at least one measure;
    analyze the first cell rule to identify at least one dimension of the data cube that is wildcarded in a first specification of the first cell rule of cells of the data cube that are subject to the first cell rule;
    generate the rule cube indicating applicability of the first cell rule to the selected portion of the data cube, wherein a cell of the rule cube corresponds to multiple cells of the data cube, and wherein at least one dimension of the rule cube that corresponds to the at least one dimension of the data cube is reduced in length in comparison to a length of the at least one dimension of the data cube;
    receive a request for an indication of cell rules applicable to the selected portion of the data cube; and
    transmit the indication of the cell rules in response to the received request.

2. The computer-program product of claim 1, the computing device caused to perform operations including:
    analyze the first cell rule and a second cell rule applicable to the data cube to determine whether the first specification of the first cell rule and a second specification of the second cell rule wildcard identical dimensions of the data cube, wherein the second specification specifies cells of the data cube that are subject to the second cell rule; and
    generate the rule cube to indicate applicability of the first and second cell rules to the selected portion of the data cube based on the determination.

3. The computer-program product of claim 2, the computing device caused to perform operations including select the second cell rule to include in the rule cube based on applicability of the second cell rule to the selected portion of the data cube.

4. The computer-program product of claim 1, the computing device caused to perform operations including:
    receive a request via a network from another computing device for the selected portion of the data cube;

determine whether a cell of the rule cube stores an indication that the first cell rule denies access to any cell instantiated at a crossing within the selected portion of the data cube by the other computing device;

generate the selected portion of the data cube;

selectively instantiate a cell at the crossing within the selected portion of the data cube based on the determination; and transmit the selected portion of the data cube to the other computing device via the network.

5. The computer-program product of claim 4, the computing device caused to perform operations including:

aggregate detailed data to generate a measure, wherein operations to aggregate the detailed data comprise at least one of sum the detailed data, average the detailed data or take a weighted average of the detailed data; and store the measure at the cell at the crossing within the selected portion of the data cube.

6. The computer-program product of claim 1, the computing device caused to perform operations including:

perform a calculation that comprises storing a result as a measure of at least one cell of the selected portion of the data cube;

determine whether a cell of the rule cube that corresponds to the at least one cell stores an indication that the first cell rule does not permit storing the result as a measure of the at least one cell; and selectively store the result as a measure of the at least one cell based on the determination.

7. The computer-program product of claim 1, the computing device caused to perform operations including:

generate, on a display, an indication of the first cell rule; and monitor a manually operable control for an indication of operation of the control to specify the selected portion of the data cube.

8. The computer-program product of claim 1, the computing device caused to perform operations including:

analyze a cell of the rule cube that corresponds to at least one cell of the selected portion of the data cube to determine whether the first cell rule denies access to the at least one cell; and selectively provide access to the at least one cell based on the determination.

9. A computer-implemented method comprising:

selecting, on a computing device, a first cell rule applicable to a data cube to include in a rule cube based on applicability of the first cell rule to a selected portion of the data cube, the first cell rule comprising at least one of restricting read access to at least one cell of the data cube, restricting write access to the at least one cell, restricting access to change a measure or a pointer of the at least one cell, restricting a degree of change in at least one measure stored at the at least one cell during a calculation, imposing a minimum value on the at least one measure, and imposing a maximum value on the at least one measure;

analyzing, on the computing device, the first cell rule to identify at least one dimension of the data cube that is wildcarded in a first specification of the first cell rule of cells of the data cube that are subject to the first cell rule;

generating, on the computing device, the rule cube indicating applicability of the first cell rule to the selected portion of the data cube, wherein a cell of the rule cube corresponds to multiple cells of the data cube, and wherein at least one dimension of the rule cube that corresponds to the at least one dimension of the data cube is reduced in length in comparison to a length of the at least one dimension of the data cube;

receiving, at the computing device, a request for an indication of cell rules applicable to the selected portion of the data cube; and transmit the indication of the cell rules in response to the received request.

10. The computer-implemented method of claim 9, comprising:

analyzing, on the computing device, the first cell rule and a second cell rule applicable to the data cube to determine whether the first specification of the first cell rule and a second specification of the second cell rule wildcard identical dimensions of the data cube, wherein the second specification specifies what cells of the data cube are subject to the second cell rule; and generating, on the computing device, the rule cube to indicate applicability of the first and second cell rules to the selected portion of the data cube based on the determination.

11. The computer-implemented method of claim 10, comprising selecting the second cell rule to include in the rule cube based on applicability of the second cell rule to the selected portion of the data cube.

12. The computer-implemented method of claim 9, comprising:

receiving, at the computing device, a request via a network from another computing device for the selected portion of the data cube;

determining whether a cell of the rule cube stores an indication that the first cell rule denies access to any cell instantiated at a crossing within the selected portion of the data cube by the other computing device;

generating, on the computing device, the selected portion of the data cube;

selectively instantiating a cell at the crossing within the selected portion of the data cube based on the determination; and transmitting the selected portion of the data cube to the other computing device via the network.

13. The computer-implemented method of claim 12, comprising:

aggregating, on the computing device, detailed data to generate a measure, wherein aggregating the detailed data comprises at least one of summing the detailed data, averaging the detailed data or taking a weighted average of the detailed data; and store the measure at the cell at the crossing within the selected portion of the data cube.

14. The computer-implemented method of claim 9, comprising:

performing a calculation that comprises storing a result as a measure of at least one cell of the selected portion of the data cube;

determining whether a cell of the rule cube that corresponds to the at least one cell stores an indication that the first cell rule does not permit storing the result as a measure of the at least one cell; and selectively store the result as a measure of the at least one cell based on the determination.

15. The computer-implemented method of claim 9, comprising:

generating, on a display, an indication of the first cell rule; and monitoring a manually operable control for an indication of operation of the control to specify the selected portion of the data cube.

16. The computer-implemented method of claim 9, comprising:

analyzing a cell of the rule cube that corresponds to at least one cell of the selected portion of the data cube to determine whether the first cell rule denies access to the at least one cell; and selectively providing access to the at least one cell based on the determination.

17. An apparatus comprising:

a processor component;

a selection component for execution by the processor component to select a first cell rule applicable to a data cube based on applicability of the first cell rule to a selected portion of the data cube; and a generating component for execution by the processor component to:

analyze the first cell rule to identify at least one dimension of the data cube that is wildcarded in a first specification of the first cell rule of cells of the data cube that are subject to the first cell rule, the first cell rule comprising at least one of restricting read access to at least one cell of the data cube, restricting write access to the at least one cell, restricting access to change a measure or a pointer of the at least one cell, restricting a degree of change in at least one measure stored at the at least one cell during a calculation, imposing a minimum value on the at least one measure, and imposing a maximum value on the at least one measure; and generate a rule cube indicating applicability of the first cell rule to the selected portion of the data cube, wherein a cell of the rule cube corresponds to multiple cells of the data cube, and wherein at least one dimension of the rule cube that corresponds to the at least one dimension of the data cube is reduced in length in comparison to a length of the at least one dimension of the data cube; and a communications component for execution by the processor component to receive a request for an indication of cell rules applicable to the selected portion of the data cube and transmit the indication of the cell rules in response to the received request.

18. The apparatus of claim 17, comprising a grouping component to analyze the first cell rule and a second cell rule applicable to the data cube to determine whether the first specification of the first cell rule and a second specification of the second cell rule wildcard identical dimensions of the data cube, wherein:

the second specification specifies what cells of the data cube are subject to the second cell rule; and the generating component generates the rule cube to indicate applicability of the first and second cell rules to the selected portion of the data cube based on the determination.

19. The apparatus of claim 18, wherein the selection component selects the second cell rule based on applicability of the second cell rule to the selected portion of the data cube.

20. The apparatus of claim 17, comprising:

a manually operable control; and a user interface (UI) component for execution by the processor component to monitor the manually operable control for an indication of manual operation of the control to specify the selected portion of the data cube.

21. The apparatus of claim 20, comprising a display, wherein the UI component generates, on the display, an indication of the first cell rule.

22. The apparatus of claim 20, comprising a filter component for execution by the processor component to remove from the selected portion of the data cube a cell of the data cube based on whether a corresponding cell of the rule cube stores an indication that the first cell rule denies access to the cell of the data cube.

23. The apparatus of claim 17, comprising a filter component for execution by the processor component to analyze a cell of the rule cube that corresponds to at least one cell of the selected portion of the data cube to determine whether the first cell rule denies access to the at least one cell, and to selectively provide access to the at least one cell based on the determination.

* * * * *